United States Patent [19]

Atake

[11] Patent Number: 5,070,696
[45] Date of Patent: Dec. 10, 1991

[54] TORQUE TRANSMISSION DEVICE FOR VARIABLE SPEED CONTROL

[76] Inventor: Minoru Atake, 579-6, Ohoiso, Ohoiso-machi, Kanagawa-ken, Japan

[21] Appl. No.: 456,143

[22] Filed: Dec. 22, 1989

[30] Foreign Application Priority Data

Dec. 29, 1988 [JP] Japan ............................ 63-335193
Dec. 29, 1988 [JP] Japan ............................ 63-335194
Jan. 18, 1989 [JP] Japan ................................. 1-9162
Jan. 18, 1989 [JP] Japan ................................. 1-9163

[51] Int. Cl.$^5$ ............................................. F16D 39/00
[52] U.S. Cl. ........................................ 60/487; 60/488; 60/489; 91/504; 91/505; 417/222 R; 417/269
[58] Field of Search ................. 60/487, 488, 489, 490; 91/504, 505, 506; 417/222, 269

[56] References Cited

U.S. PATENT DOCUMENTS

| | | | |
|---|---|---|---|
| 3,054,263 | 9/1962 | Bubzich | 60/490 X |
| 3,788,078 | 1/1974 | Rubenstein | 60/488 X |
| 4,646,520 | 3/1987 | Furumoto et al. | 60/487 X |
| 4,781,022 | 11/1988 | Hayashi et al. | 60/490 X |
| 4,838,024 | 6/1989 | Yamamoto et al. | 60/487 X |
| 4,845,951 | 7/1989 | Hayashi et al. | 60/488 |
| 4,854,125 | 8/1989 | Inoue | 60/487 X |
| 4,860,540 | 8/1989 | Hayashi et al. | 60/487 |
| 4,938,024 | 7/1990 | Matsuto et al. | 60/488 X |

Primary Examiner—Edward K. Look
Assistant Examiner—Todd Mattingly
Attorney, Agent, or Firm—Frishauf, Holtz Goodman & Woodward

[57] ABSTRACT

A torque transmission apparatus has a hydraulic assembly with a variable speed control, and comprises first and second rotors at a power side of the transmission apparatus, the rotors being coaxially rotatable with respect to each other. The first rotor has a swash plate facing the second rotor. The second rotor has a plurality of cylindrical bores which have open ends facing the swash plate and other ends which are communicated with through bores arranged in communication with ports. Plunger members are provided for sliding in the cylindrical bores, the plunger members being guided by the swash plate. A control rotor and a stator are provided at a control side of the transmission apparatus. The stator has a swash plate, and the control rotor has cylindrical bores having open ends facing the swash plate of the stator and communicating with through bores in the stator. Plungers are provided which slide in the cylindrical bores of the control rotor, guided by the variable swash plate of the stator. The inclination of the variable swash plate of the stator is controlled. A liquid supply device, including one-way valves coupled to respective passages which communicate the ports of the first rotor with ports of the stator, is provided for supplying liquid at a prescribed back-up pressure to the ports.

5 Claims, 23 Drawing Sheets

TORQUE TRANSMISSION DEVICE FOR VARIABLE SPEED CONTROL

BACKGROUND OF THE INVENTION

This invention relates to a torque transmission device with an hydraulic assembly for variable speed control, and more particularly, to a torque transmission device for use in a car, truck and the like, for controlling the speed thereof.

A torque transmission device with an hydraulic assembly is well known in the prior art, such as an hydraulic variable speed control device described in Japanese Patent Publication No. 9665/57.

The known device comprises a transmission mechanism having a swash plate pump and a motor which includes the same construction as that of the pump and communicates with the pump by means of a closed fluid circuit, and a gear transmission mechanism adapted to regain back-up torque generated in the pump to a driven shaft, so as to transmit torque from a driving shaft to the driven shaft through two parallel routes, one of which includes the fluid circuit and the other of which includes no fluid circuit but instead utilizes said gear transmission mechanism.

However, the known device of Japanese Patent Publication No. 9665/57 involves some unavoidable problems. One of them is that the driving and driven shafts thereof should be arranged in parallel with each other because the device includes gear trains in the transmission mechanism, and the other is that the device is very complicated due to the above-mentioned reason. Furthermore, the known device does not include a direct connection between the driving and driven shafts or an over-drive operation as is generally used in motorization systems.

OBJECTS OF THE INVENTION

An object of this invention is to provide a torque transmission device with an hydraulic assembly for variable speed control, having a simple construction.

A second object of this invention is to provide a torque transmission device with an hydraulic assembly for variable speed control which includes a direct connection between driving and driven members, as well as an over-drive operation.

A third object of this invention is to provide a torque transmission device with an hydraulic assembly for variable speed control, wherein driving and driven members are arranged so as to be co-axial with one another as well as with the hydraulic control means.

A fourth object of this invention is to provide a torque transmission device with an hydraulic assembly for variable speed control, wherein fluid is supplied under a prescribed pressure to the hydraulic assembly.

SUMMARY OF THE INVENTION

According to one embodiment of this invention, there is provided a torque transmission device with an hydraulic assembly for variable speed control comprising an input rotor having pump-driving means; an output rotor having pump-driven means, one of said rotors including an inlet port receiving fluid to be pumped and an outlet port delivering the pumped fluid, said pump-driving means operating said pump-driven means by mutual differential rotation between said rotors so as to cause said fluid to be pumped; a control rotor; and a stator; one of said control rotor and stator having flow-control means, and the other having flow-return means which is operated by said flow-control means, said flow-control means including a secondary inlet port communicated with said outlet port so as to receive said fluid through a first passage and a secondary outlet port communicated with said inlet port so as to deliver said fluid through a second passage, and said flow-control means further including means for regulating amounts of pumping per rotation of said control rotor which integrally rotates with either one of said input and output rotors.

Further features and advantages of the present invention will be apparent from the following description taken with reference to the accompanying drawings.

DETAILED DESCRIPTION

Figure 1:
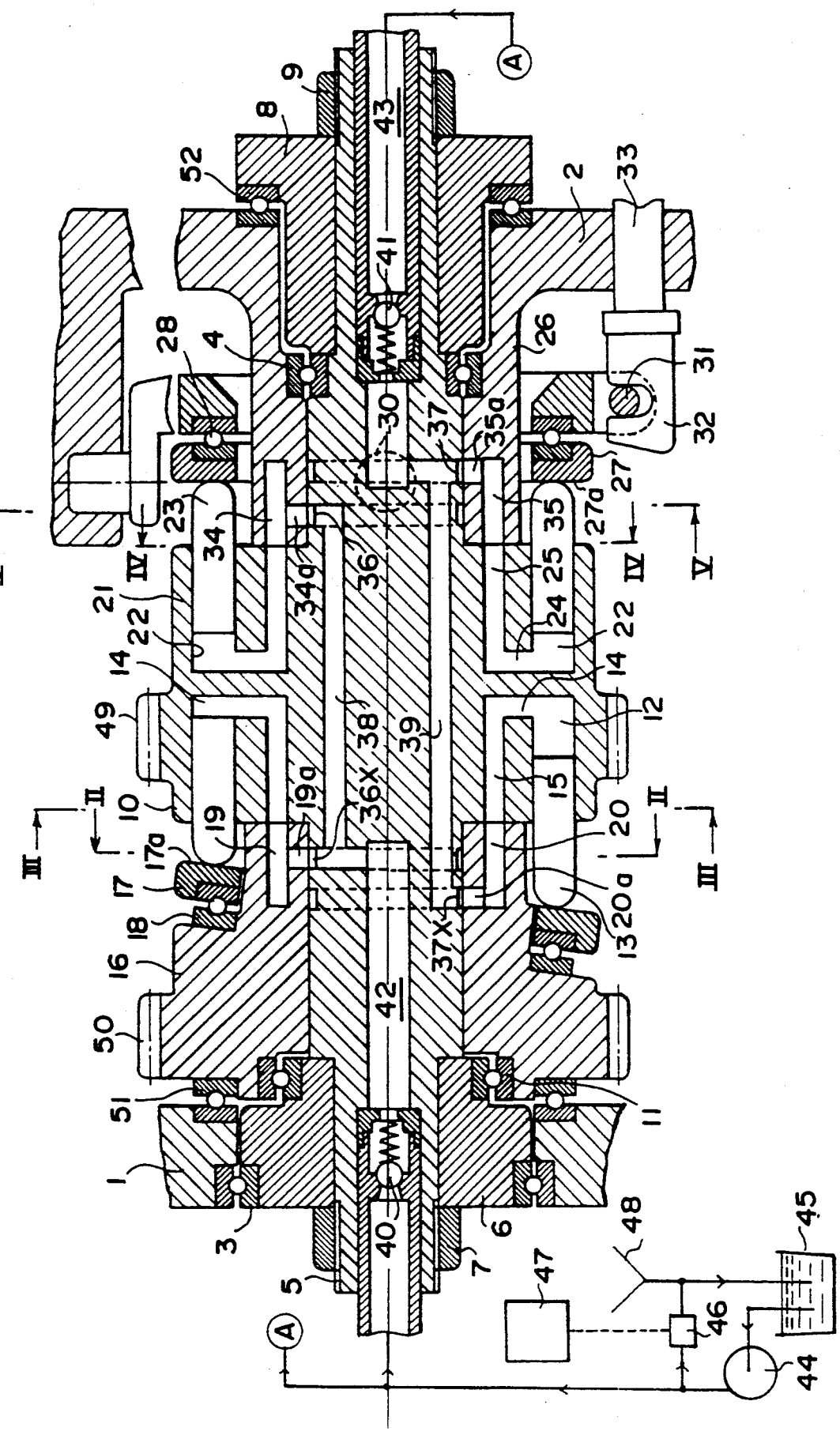
FIG. 1 is a vertical cross section of a torque transmission device with a hydraulic assembly according to an embodiment of this invention.
Figure 2:
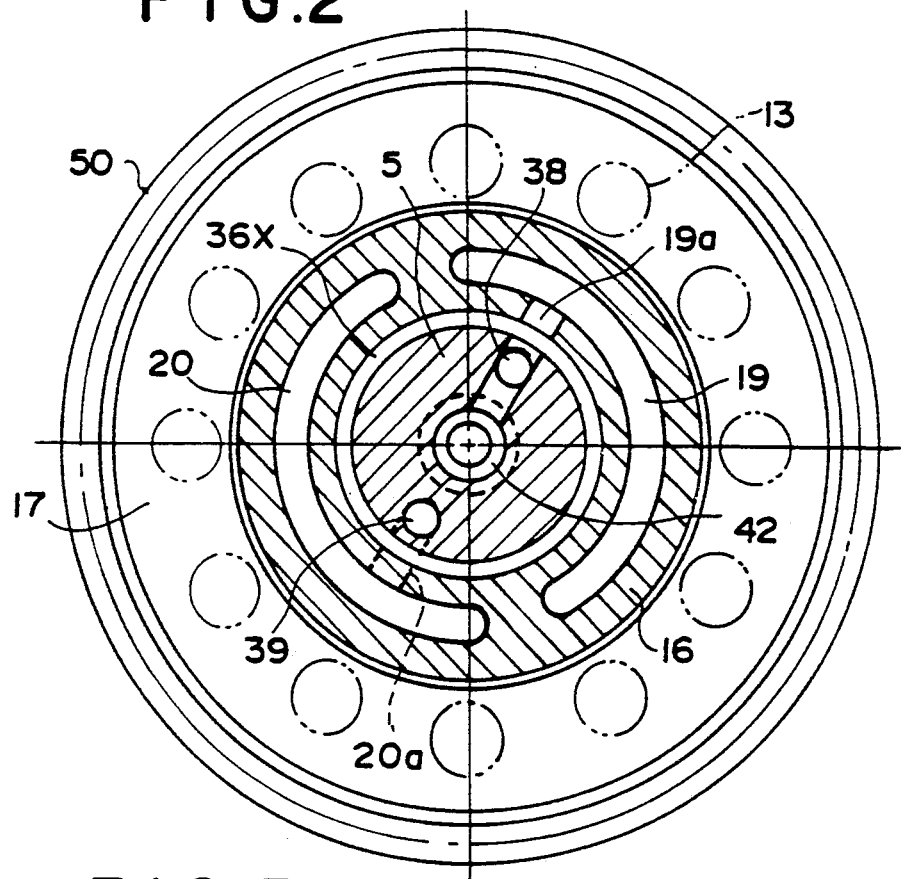
FIGS. 2 to 5 are cross sections which are indicated by lines II—II to V—V, respectively, on FIG. 1.
Figure 3:
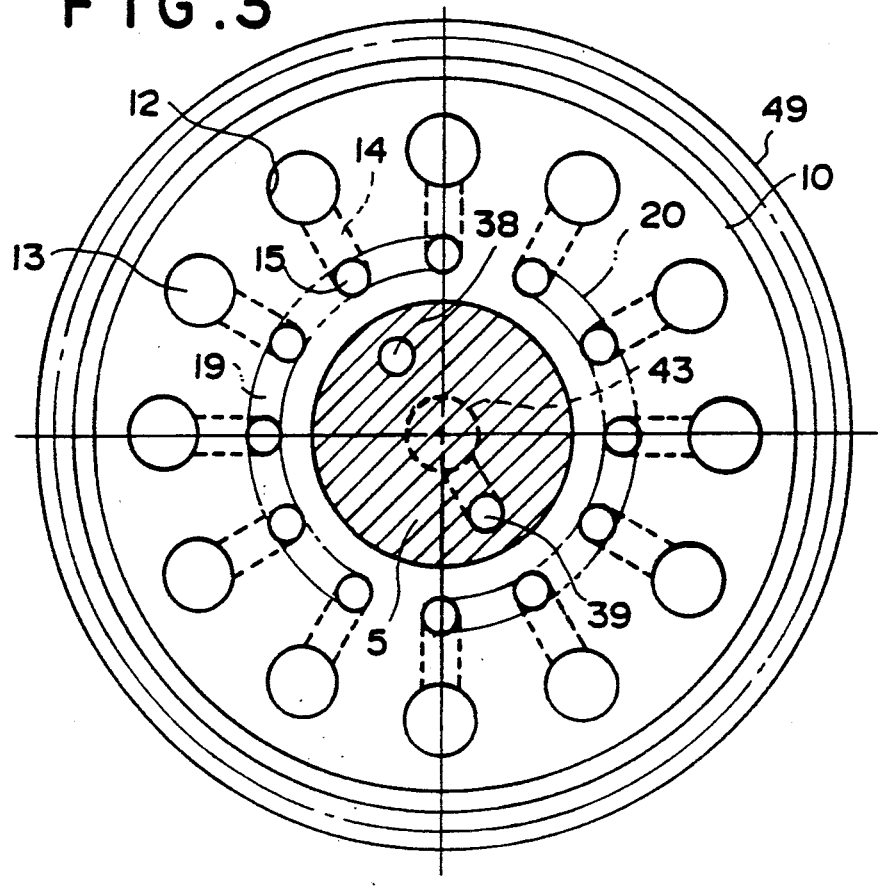
Figure 4:
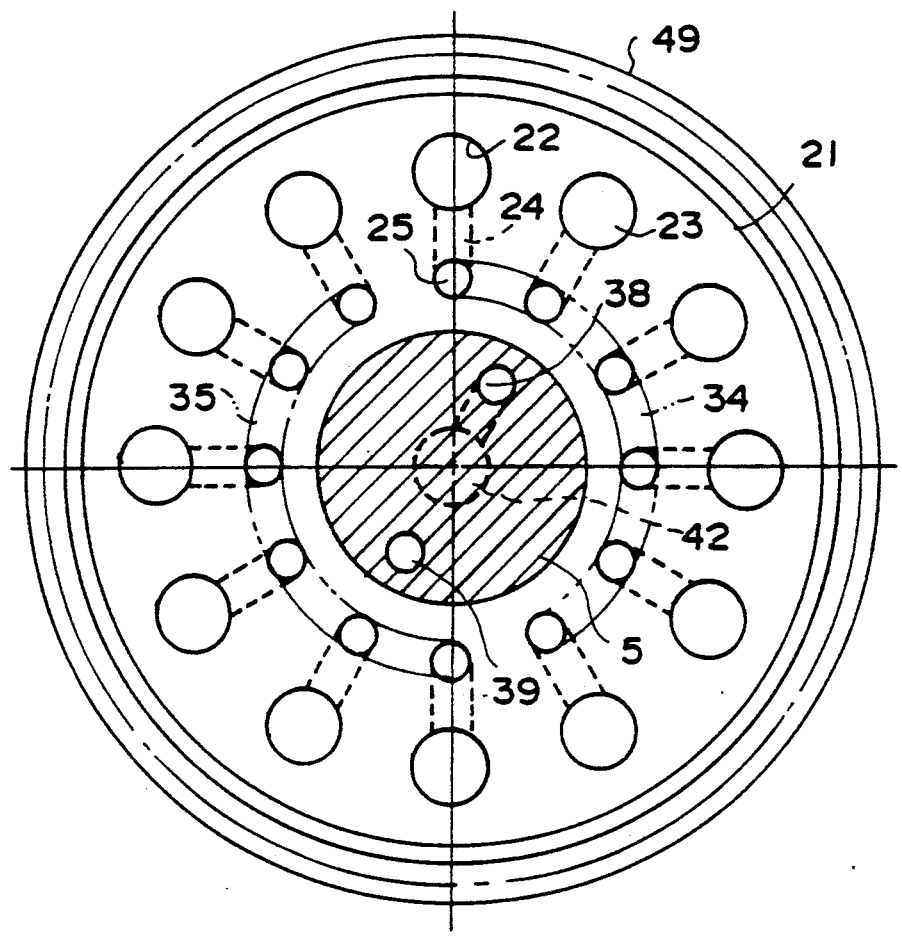
Figure 5:
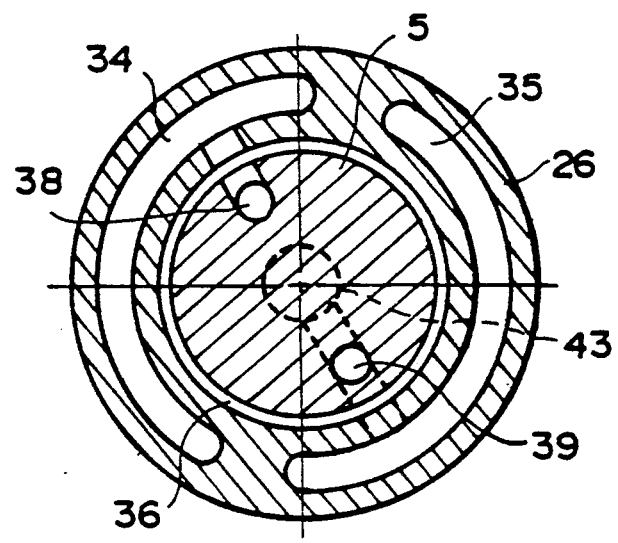
Figure 6:
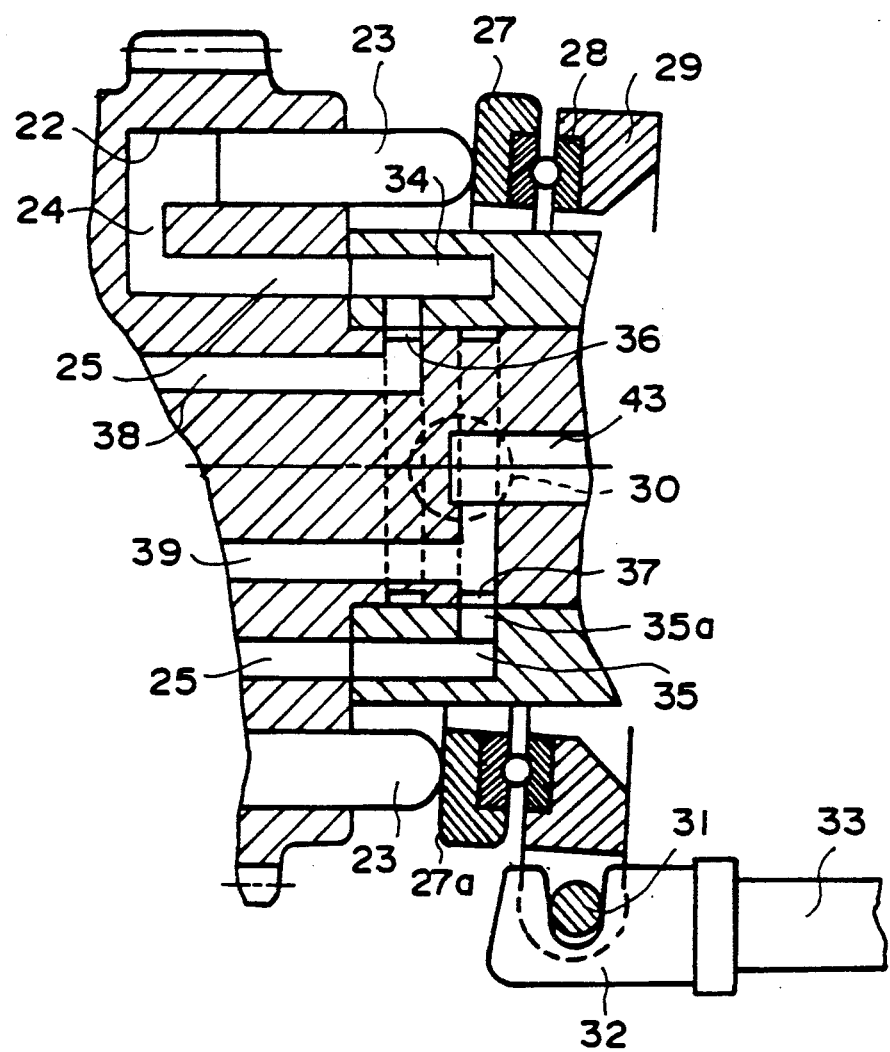
FIG. 6 is a vertical cross section of part of said device which is illustrated under a condition for control operations.
Figure 7:
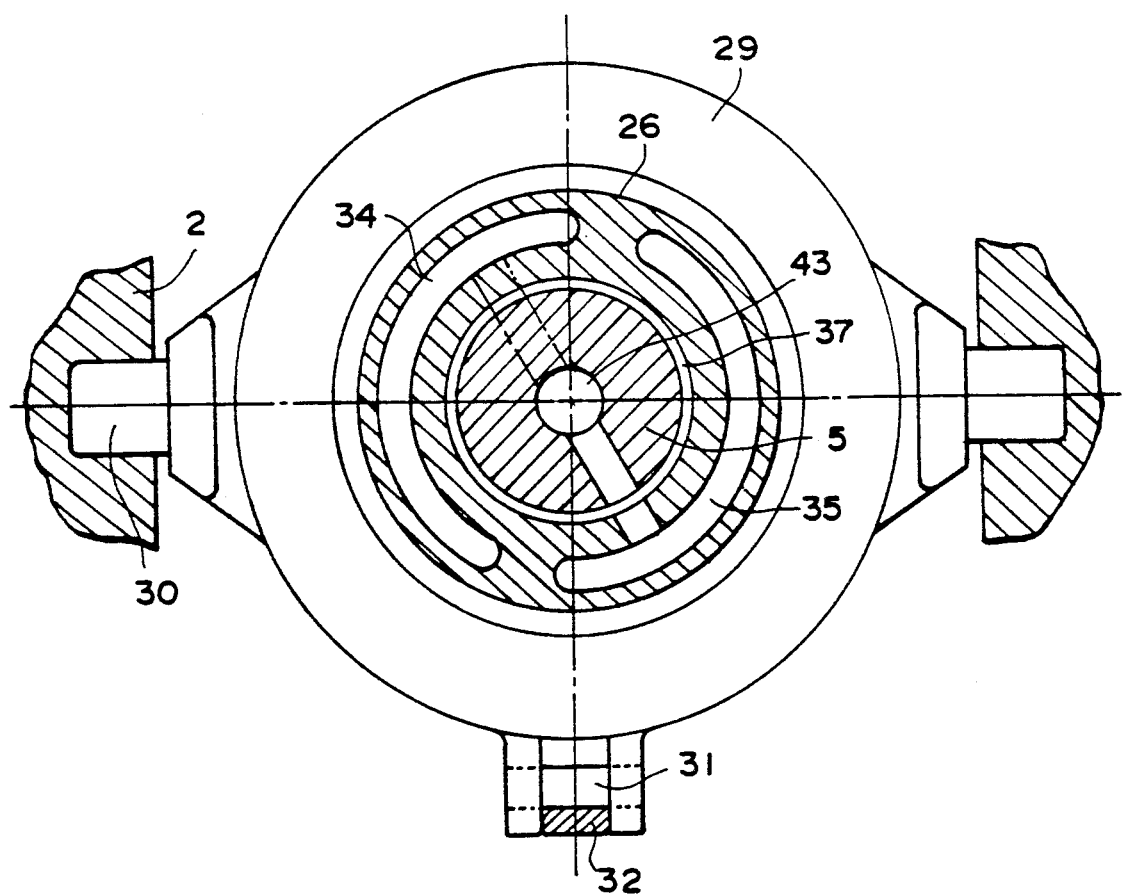
FIG. 7 is an end view of an adjustable swash plate included in said device.

A first embodiment of a torque transmission device with a hydraulic assembly for variable speed control is illustrated in FIGS. 1 to 7. In the first embodiment, the device comprises a rotary shaft 5 journalled in radial bearings 3 and 4 through sleeves 6 and 8 which are fixedly set to the rotary shaft 5 by means of stop nuts 7 and 9 screwed to the shaft 5, the bearings 3, 4 being supported by frames 1 and 2 of the device.

The device further comprises an input rotor 10 integrally formed with the rotary shaft 5 and having pump-driving means (described hereinafter). An output rotor 16 is rotatably supported on the rotary shaft 5 through a radial bearing 11, and has pump-driven means (described hereinafter).

The pump-driven means of the output rotor 16 comprises a swash plate 17 rotatably supported on a rotor body included in the output rotor 16, through a bearing 18 attached to the rotor body with a prescribed inclination relative to the axis of the output rotor, and having an inclined guide surface 17a formed on the inclined surface thereof. The swash plate 17 may be integrally formed with the rotor body with its guide surface keeping said inclination. The rotor body has an end in which inlet and outlet ports 19 and 20 are positioned at both sides of the inclined guide surface 17a with their ports being formed into half-circular grooves respectively.

The pump-driving means comprises a plurality of cylindrical bores 12 formed at one end of the input rotor 10 opposite to that of the output rotor 16 in a manner to be equally spaced on a prescribed pitch circle co-axial to that of the input rotor, to which the inlet and outlet ports 19 and 20 are tightly faced, a plurality of plunger members 13 slidably inserted into the cylindrical bores 12 respectively in a manner to be guided by the swash plate 17, and a plurality of through bores 15 passing through radial paths 14 to the cylindrical bores 12 so as to communicate the cylindrical bores 12 orderly with the inlet and outlet ports 19 and 20 opposite to the through bores 15 when the input and output rotors 10 and 16 are differentially rotated with respect to each other. Preferably, the half-circular grooves formed co-axially to the axis of the rotor, and the through bores 15 are formed on a pitch circle tracing the grooves.

In the embodiment, the output rotor is supported on the frame 1 through a thrust bearing 51 and the swash plate 17 is slidably attached to the free ends of the plunger members 13 due to fluid pressure supplied to the cylindrical bores 12. However, according to another aspect of this embodiment, the swash plate 17 may be provided with couplers such as Caldarn couplers well known in the prior art, which are pivotally connected to the free ends of the plunger members 13 respectively.

Furthermore, in this embodiment of FIGS. 1–7, the inlet and outlet ports 19 and 20 are individually communicated via radial paths 19a and 20a with annular grooves 36x and 37x which are formed on the periphery of the rotary shaft 5. The grooves 36x and 37x are individually communicated via radial paths with second and first passages 38 and 39 respectively, the passages being formed on the rotary shaft 5 parallel to its lengthwise direction.

In addition, the input and output rotors 10 and 16 have input and output gears 49 and 50 integrally formed on the peripheries of the rotors, respectively, in this embodiment.

The torque transmission device of this invention further comprises a stator 26 having flow-control means described hereinafter and a control rotor 21 having flow-return means which is operated by the flow-control means. The flow-control means includes a secondary inlet port 35 communicated with the outlet port 20 so as to receive the fluid through the first passage 39, and a secondary outlet port 34 communicated with the inlet port 19 so as to deliver the fluid through a second passage 38. In detail, the secondary outlet and inlet ports 34 and 35 are communicated via radial paths 34a and 35a with annular grooves 36 and 37 which are formed on the periphery of the rotary shaft 5. The grooves 36 and 37 are individually communicated via radial paths with the second and first passages 38 and 39 respectively. The flow-control means in this embodiment further includes an adjustable swash plate 27 having a guide surface 27a and disposed at one end thereof in which the secondary inlet and outlet ports 34 and 35 are positioned at both sides of inclination of the swash plate 27. The swash plate 27 is supported to a support disc 29 through a thrust bearing 28 and the support disc 29 has two pivot members 30 journalled to the frame 2 at both sides of the swash plate 27. According to another aspect of this embodiment, the swash plate 27 may be integrally formed with the support disc 29 so as to obtain a simple form. Furthermore, the flow-control means includes means for regulating the inclination angle of the swash plate 27. The regulating means in this embodiment, comprises a control rod 33 slidably supported on the frame 2 and having a guide fork 32, and an actuator (not shown) for moving the control rod 33 in a direction parallel to the axis of the rotary shaft 5 and gripping the control rod 33 at a selected position. The support disc 29 has a control pin 32 which is disposed at a lower side thereof in a manner to extend to a direction perpendicular to the axis of the rotary shaft 5, so that the control pin 31 is engaged with the control rod 33 so as to cause the swash plate 27 to be inclined at a selected angle around the axis of the pivot member 30 by the motion of the control rod 33.

The flow-return means in this embodiment comprises a plurality of cylindrical bores 22 formed at one end of the control rotor 21 opposite to the swash plate 27 in a manner to be equally spaced on a prescribed pitch circle co-axial with that of the rotor 21, a plurality of plunger members 23 slidably inserted into the cylindrical bores 22 respectively in a manner to be guided by the swash plate 27, and a plurality of through bores 25 communicating via radial paths 24 with the cylindrical bores 22 and adapted to communicate the cylindrical bores 22 orderly with the secondary inlet and outlet ports 35 and 34 opposite to the through bores 25 when the control rotor 21 is rotated. Then, the secondary inlet and outlet ports 35 and 34 are tightly faced to one end surface of the rotor 21 to which the through bores 25 are opened.

According to another aspect of this embodiment, the plunger members 23 may be provided with their free ends connected to the swash plate 27 through couplers such as Caldarn couplers and the like.

The torque transmission device according to this invention includes means for supplying fluid such as oil and the like individually to the first and second passages 39 and 38 so as to maintain the fluid pressures at prescribed values. In this embodiment, the supplying means includes a pump system having a pump 44 driven by a motor (not shown), a pressure control valve 46 which is regulated by means of control unit 47, and two one-way valves 40 and 41 for preventing the supplied fluids from being returned to the delivery port of the pump 44 from the second and first passages 38 and 39. Therefore, the one-way valves 40 and 41 are disposed in passages 42 and 43 formed to the interior of the rotary shaft 5, said passages 42 and 43 being individually communicated with the second and first passages 38 and 39.

In this embodiment of FIGS. 1–7, there are further provided a tank 45 as a fluid source, and an oil pan 48 for receiving and accumulating the fluid leakage from the torque transmission device so as to feed the fluid back to the tank 45. Preferably, means for oil sealing to necessary portions of the device may be adapted, for example, to clearances existing between the inner peripheries of the cylindrical bores 12 or 22 and the outer peripheries of the plunger members 13 or 23, as well as between the opposite surfaces of the input and output rotors 10 and 16 through which the through bores 15 are communicated with the inlet and outlet ports 19 and 20. Similarly, it may be preferred to provide a sealing between the opposite surfaces of the control rotor 21 and stator 26, through which the through bores 25 are communicated with the inlet and outlet ports 35 and 34.

It is important to consider that the fluid circuit of this torque transmission device is always filled by the fluid so as to obtain a smooth starting operation. Accordingly, the torque transmission device may be provided with suitable means well known in the prior art in order to obtain such a condition.

Firstly, as the pump 44 is driven, the fluid passages 39 and 38 are maintained at minimum pressures determined by the pressure control valve 46. In this condition, as torque power is applied to the input rotor 10, it revolves with said gear 49 driven by a driving gear (not shown) intermeshed thereto. And then the input rotor 10 is rotated, for instance, in a clockwise direction in FIGS. 2 and 4, so that the pump-driving means transmits the torque to the pump-driven means as two separated powers, one of which is applied to the output rotor 16 dynamically, and the other of which is applied to the pumping operation generated by means of the plunger members 13 reciprocated in the cylindrical bores 12 as their free ends trace on the guide surface 17a of the swash plate 17. Accordingly, the fluid in the cylindrical bores positioned at one side at which half of the plunger members 13 are pushed by the swash plate 17, flows out from the through bores 15 to the outlet port 20, and the fluid in the cylindrical bores positioned at other side at which the remaining half of the plunger members 13 are protruded toward the swash plate 17, pull up surplus through the through bores 15 from the inlet port 19.

On other hand, an amount of pumped fluid is determined by the inclination angle of the adjustable swash plate 27 and by the rotation of the control rotor 21. Namely, the pumping operation between the flow control means and flow return means definitely manages the amount of pumped fluid, wherein as the free ends of the plunger members 23 trace on the guide surface 27a of the swash plate 27 by the rotation of the control rotor 21 which is simultaneously rotated together with the input rotor 10 in this embodiment, the plunger members 23 are reciprocated in the cylindrical bores 22 by the guide operation of the swash plate 27. In this case, an amount of fluid flowing out from the outlet port 34 to the second passage 38 is the same as that of the fluid sucked into the inlet port 19, and an amount of fluid pulled up into the inlet port 35 is the same as that of the fluid pushed out from the outlet port 20 to the first passage 39.

In order to understand with ease the variable speed control of the torque transmission device according to this invention, suppose that the delivery amount of fluid at the outlet port 20 for one rotation of the input rotor 10 relative to the output rotor 16 is the same as that of fluid at the outlet port 34 for one rotation of the control rotor 21 relative to the stator 26 in the case where the inclined angles of the swash plates 17 and 27 are identified with each other.

If the output rotor 16 can be rotated at (r) r.p.m. as said input rotor 10 is rotated at (R) r.p.m., the differential rotation (R−r) between these rotors 10 and 16 provides a pumping operation between the pump-driving means and pump-driven means, wherein the delivery amount of fluid under the pumping operation is defined as (Q). If (r)=0, i.e., the output rotor 16 is not rotated, the delivery amount of fluid is determined as (Qx) only by the rotation of the input rotor 10. Namely, it is defined as the following formula:

$$Q = Qx(R-r)/R$$

On the other hand, the control rotor 21 is rotated with the input rotor 10 and the delivery amount of fluid under the pumping operation between the flow-control means and flow-return means is determined as (Q′) by the inclined angle of the adjustable swash plate 27. If it is supposed that a coefficient (k) is defined as a ratio between the inclined angles of the swash plate 17 and 27, the following formula holds.

$$Q^1 = k \cdot Qx$$

but $$Q^1 = Q = Qx\,(R-r)/R,$$

then $$k \cdot Qx = Qx\,(R-r)/R,$$

$$k = (R-r)/R$$

If k=1 i.e., $Q^1=Qx$, then r=0; and if k=0 i.e., $Q^1=Q=0$, then r=R, as well as if 0<k<1 then R>r>0. If it is necessary to obtain the over=drive to the output rotor 16, the co-efficient should be defined as k<0, and the coefficient for a reverse rotation of the output rotor 16 should be defined as k>1.

Accordingly, the determined inclination of the adjustable swash plate 27 manages a suitable speed ratio between the input and output rotors 10 and 16 when the control rod 33 is regulated by the actuator's operation.

In a modification of the invention of FIGS. 1–7, the input and output relation between rotors 10 and 16 may be reversed so that the rotor 16 receives torque power as an input rotor with the gear 50 being driven by a driving gear (not shown), and the rotor 10 taking out torque power as an output rotor, wherein the output torque power is held to a suitable speed which is varied by the torque transmission device. In this case, the rotor 16 includes pump-driving means which comprises a swash plate 17 with a guide plate 17a, and inlet and outlet ports 19 and 20, and the rotor 10 includes pump-driven means which comprises a plurality of cylindrical bores 12, a plurality of plunger members 13 and a plurality of through bores 15 which are already described in the first embodiment.

In this modification, the swash plate 17 forcedly guides the plunger members 13 so as to be reciprocated in the cylindrical bores 12 for a pumping operation, when the rotor 16 is rotated. In this case, a coefficient ($k^1$) is different from the coefficient (k) defined in the first embodiment. Namely, the control rotor 21 is not rotated together with the input rotor 16 but is rotated together with the output rotor 10 (which is indicated as an input rotor 10 in the first embodiment). Accordingly, the coefficient ($k^1$) is defined as follows:

$$k^1 = (R-r)\cdot k,$$

and then $$k^1 = (R-r)/r$$

If $k^1 = 1$, then $r = R/2$; i.e., the rotation of the output rotor 0 is half of that of the input rotor 16. If $k^1 = 0$, then $r = R$; i.e., the output and input rotors 10 and 16 are directly coupled to each other. Similarly, if $0 < k < 1$ then $R/2 < r < R$ i.e., and the output rotor 10 is kept to a decreased rotation as compared to that of the input rotor 16. Furthermore, if $-1 < k^1 < 0$, then $r > R$, wherein the output rotor 10 is over-driven. If $k^1 > 1$, than the output rotor 10 is held to a more-decreased rotation such as R/3, R/4 and the like.

Figure 8:
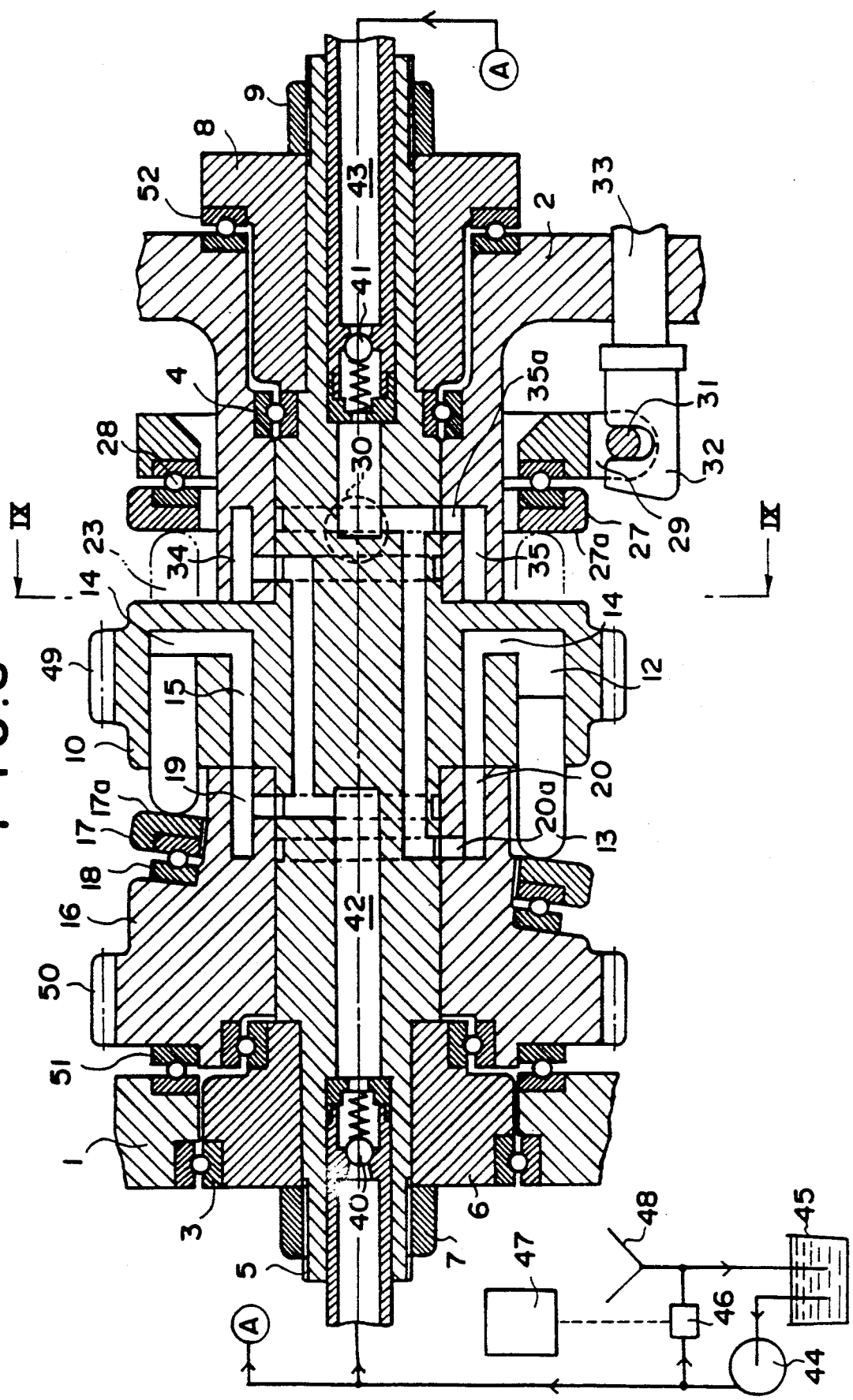
FIG. 8 is a vertical cross section of a modification of the embodiment of the torque transmission device of FIGS. 1-7.
Figure 9:
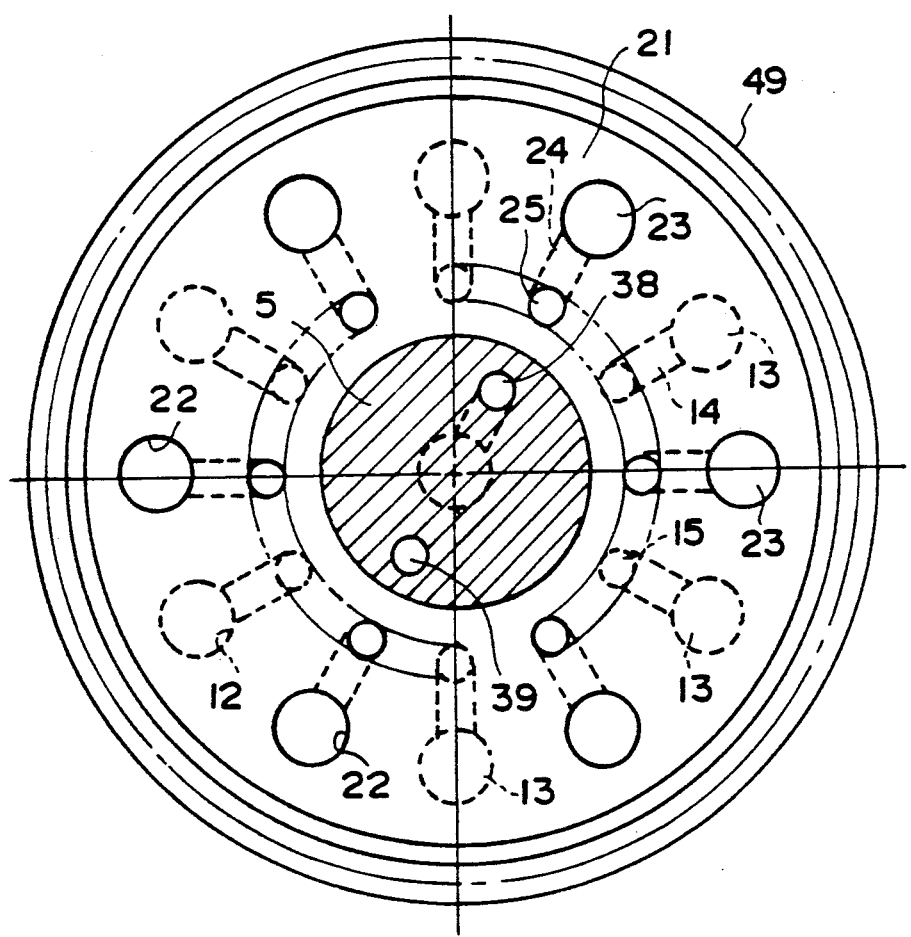
FIG. 9 is a cross section which is indicated by a line IX—IX on FIG. 8.

In order to make the torque transmission device of the first embodiment more compact, two groups of the cylindrical bores 12 and 22. With the plunger members 13 and 23 may be modified as illustrated in FIGS. 8 and 9 wherein the respective bores of the groups are alternately arranged in a common pitch circle but are opened at opposite ends of a rotor body used for both rotors 10 and 21.

Figure 10:
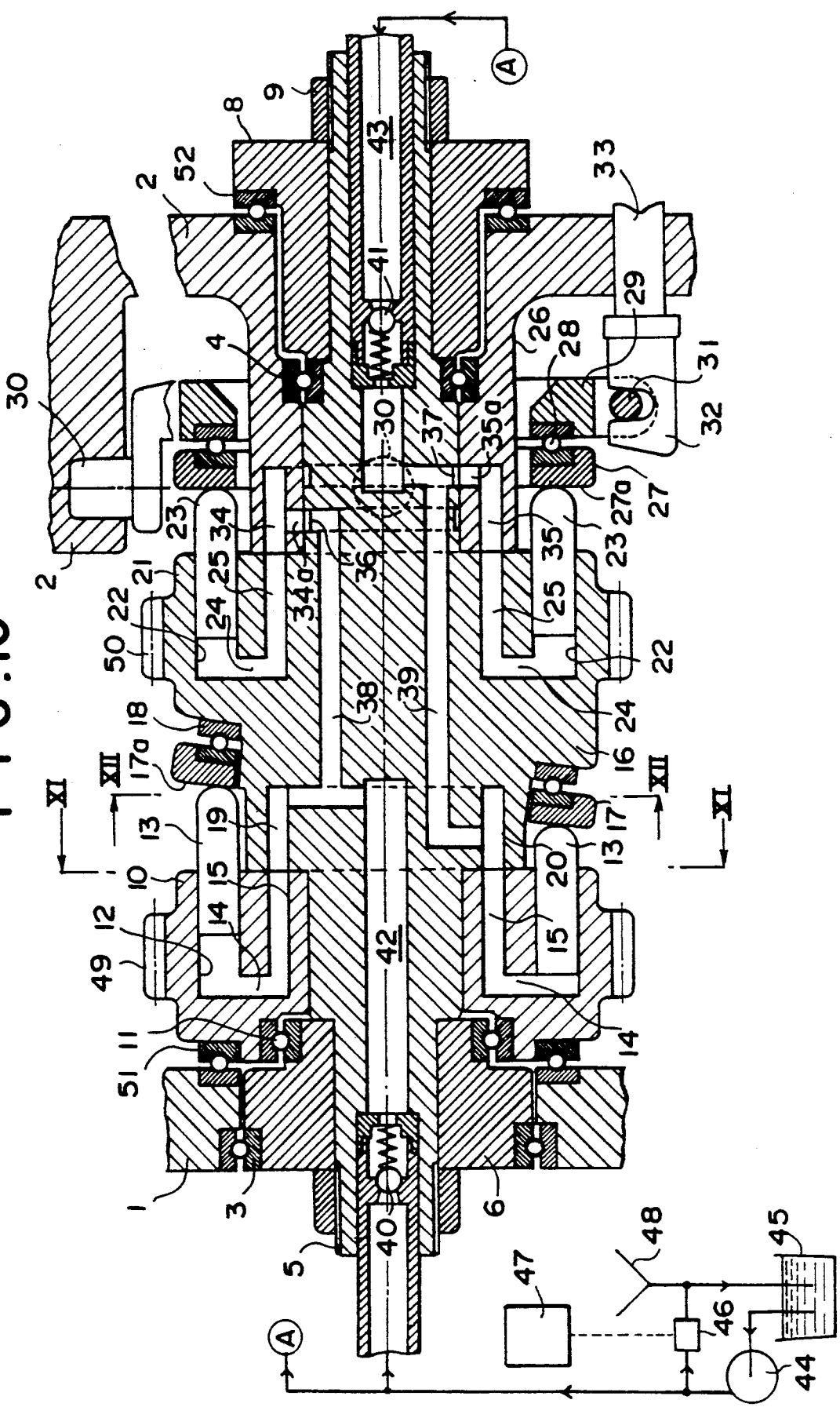
FIG. 10 is a vertical cross section of a second embodiment of this invention.
Figure 11:
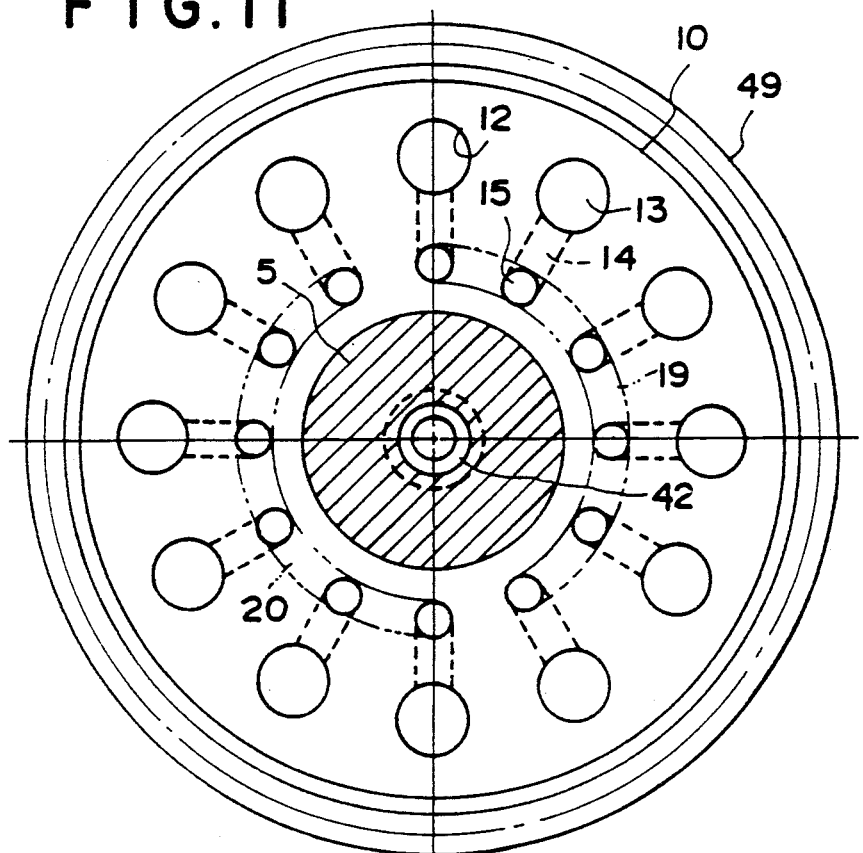
FIGS. 11 and 12 are cross sections which are indicated by lines XI—XI and XII—XII, respectively, on FIG. 10.
Figure 12:
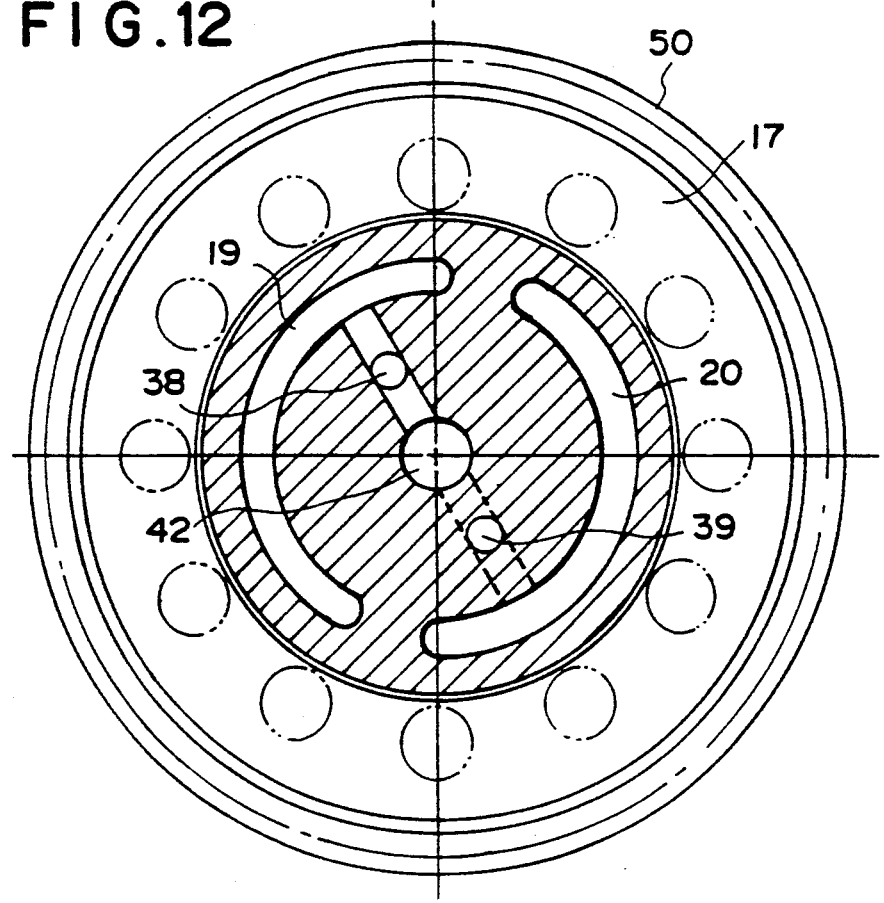
Figure 13:
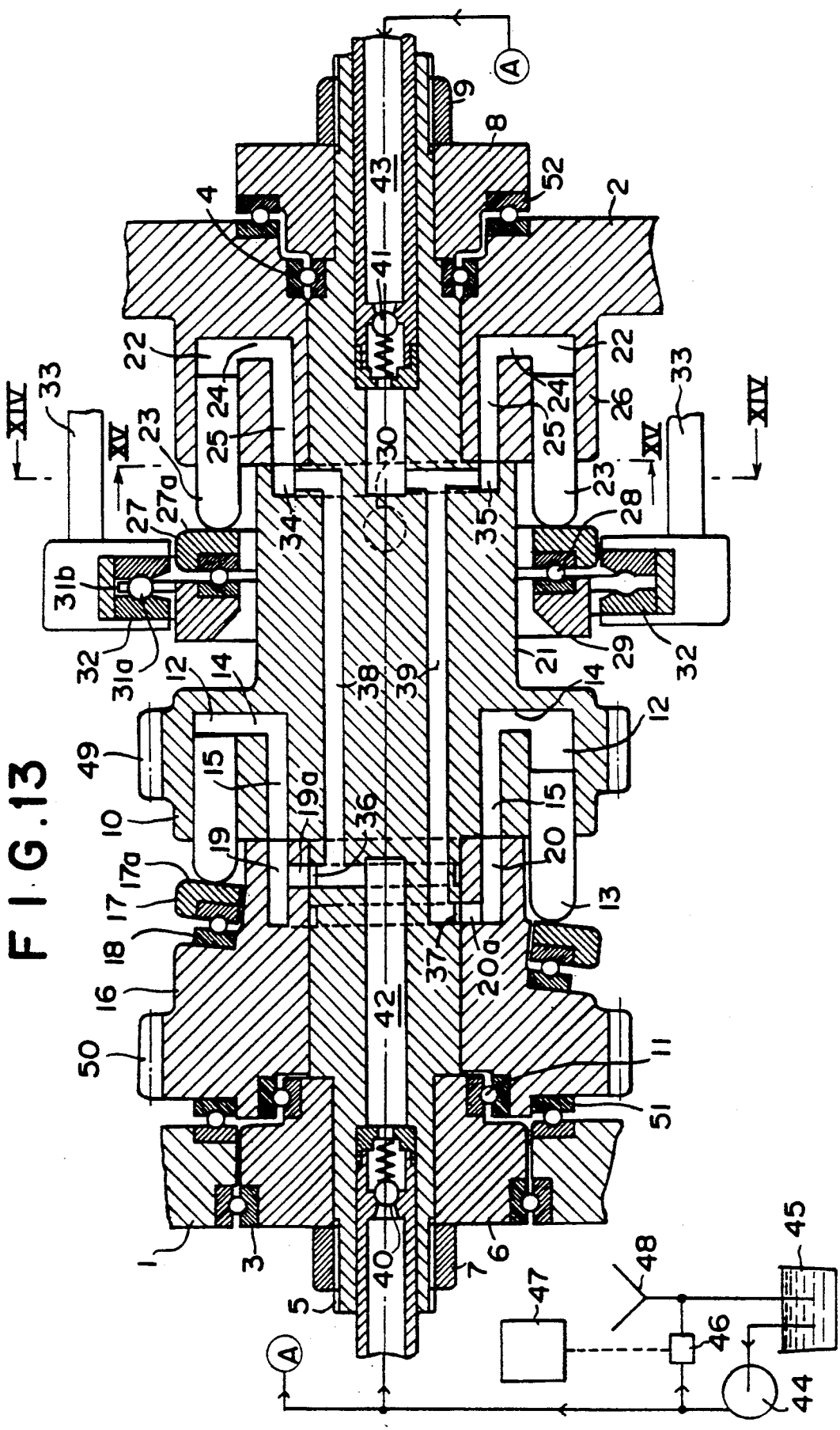
FIG. 13 is a vertical cross section of a third embodiment of this invention.
Figure 14:
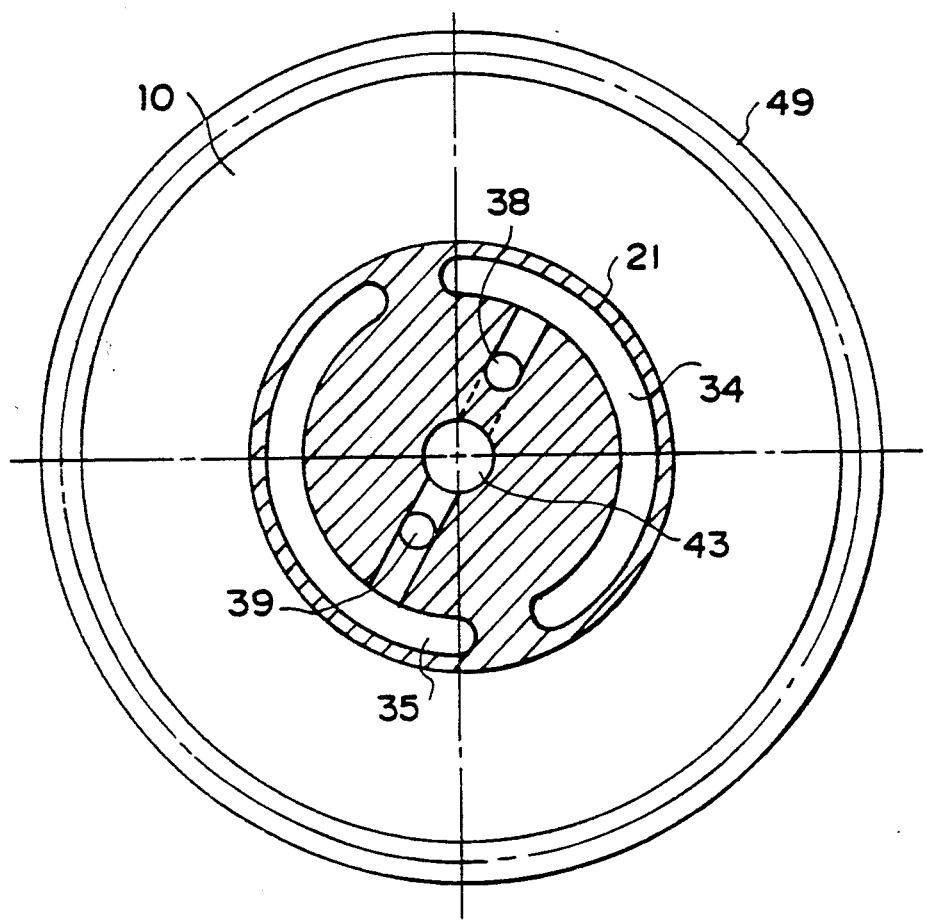
FIGS. 14 and 15 are cross sections which are indicated by lines XIV—XIV and XV—XV, respectively, on FIG. 13.
Figure 15:
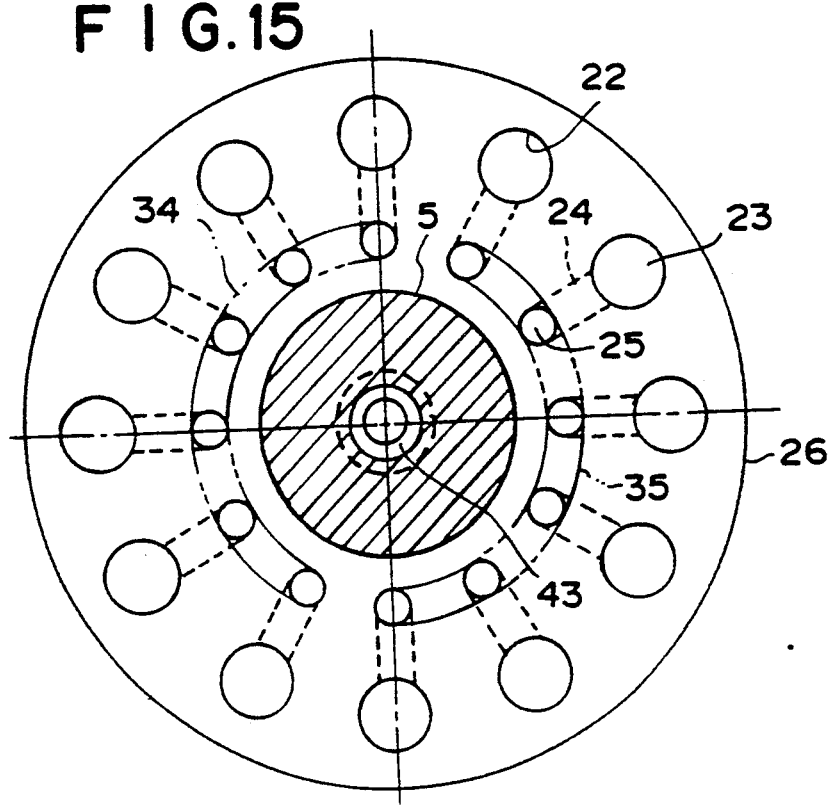
Figure 16:
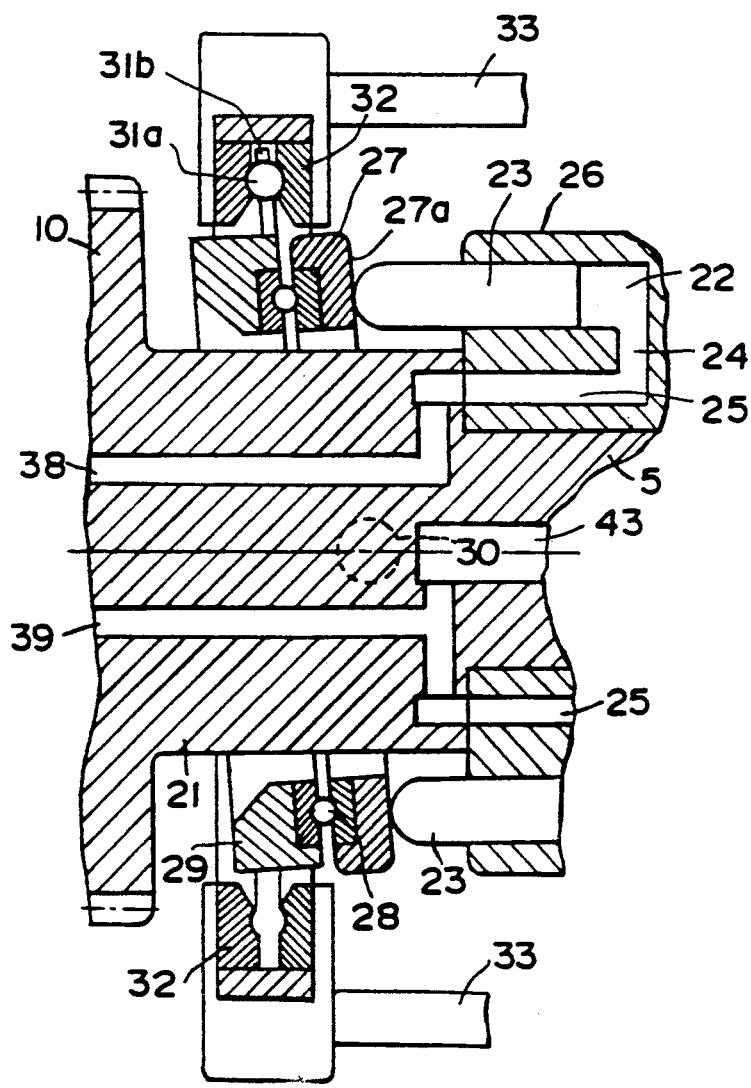
FIG. 16 is a vertical cross section of part of the device which is illustrated under a condition for control operation.
Figure 17:
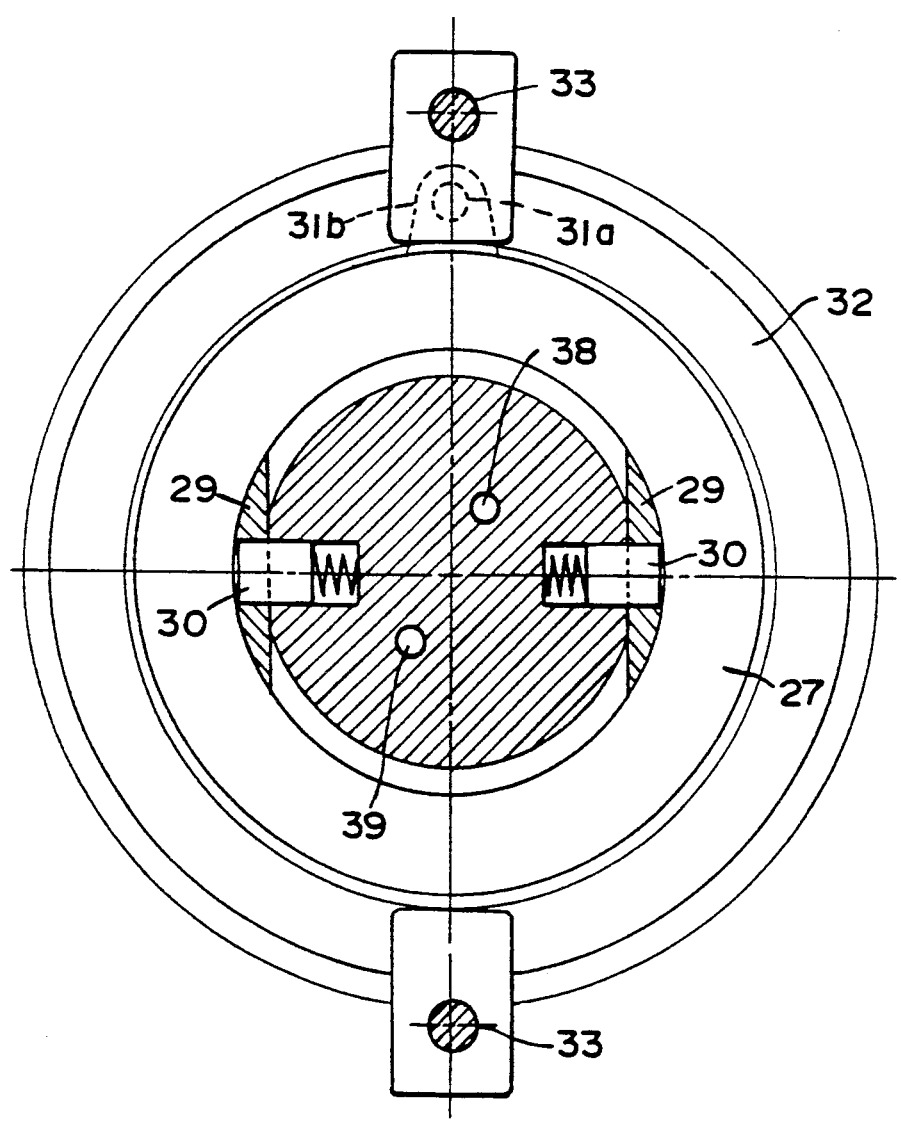
FIG. 17 is an end view of an adjustable swash plate included in said device of said third embodiment.

A second embodiment of this invention is illustrated in FIGS. 10 to 12 wherein an output rotor 16 is integrally formed with a control rotor 21 and includes pump-driven means having a swash plate 17 and inlet and outlet ports 20 and 19 (a defined by the reverse reference numbers in the first embodiment) which are individually communicated with passages 39 and 38. An input rotor 10 is independently rotated and includes pump-driving means comprising the same components as in the first embodiment (which are illustrated in FIGS. 10 to 12 by the same reference numbers). stator 26 is adapted to receive the fluid as an inlet port, and a port 35 included therein is adapted to deliver the fluid as an outlet port.

In this embodiment, the input rotor 10 is rotated in a clockwise direction in FIG. 11 and the differential rotation between the input and output rotors 10 and 16 is determined due to the coefficient ($k^1$) defined in the modification of the first embodiment.

The second embodiment may be modified so that the rotor 10 is adapted to be an output rotor and the rotor 16 is adapted to be an input rotor. In this case, the rotor 10 has pump-driven means and the rotor 16 has pump-driving means, the pump-driven and pump-driving means each including the reverse components as that of said second embodiment (though the components are not exchanged in the drawings). The coefficient used in this modification is defined by (k) of the first embodiment.

The third embodiment of this invention is illustrated in FIGS. 13 to 17 wherein a control rotor 21 includes flow-control means comprising a secondary port 35 communicated with an outlet port 20 formed in the body of a rotor 16 and a secondary port 34 communicated with an inlet port 19. A stator 26 includes flow-return means comprising a plurality of cylindrical bores 22 formed at one end of the stator 26, a plurality of plunger members 23 slidably inserted into the cylindrical bores 22, and a plurality of through bores 25 communicating with the cylindrical bores 22 and adapted to communicate the cylindrical bores 22 orderly with the secondary ports 35 and 34 opposite to the through bores 25 when the control rotor 21 is rotated. In this embodiment, the flow-control means further includes a swash plate 27 having a guide surface 27a so that the secondary ports 35 and 34 are positioned at both sides of inclination of the swash plate 27. Furthermore, the flow-control means includes means for regulating the inclination angle of the swash plate 27. In this embodiment, the swash plate 27 is supported by a support disc 29 through a thrust bearing 28. The support disc 29 has two pivot members 30 journalled to the body of the control rotor 21 at both sides of the swash plate 27. The regulating means comprises control rods 33 slidably supported to a frame and having a guide ring 32 when a circular groove, and an actuator (not shown) for moving the control rods 33 in a direction parallel to the axis of a rotary shaft 5 and gripping the control rods at a selected position. The support disc 29 has an arm 31b with a ball 32a inserted into and guided by the circular groove of the guide ring 32.

The other components of the third embodiment are approximately the same as those of the first embodiment, and a detailed explanation of the components is omitted, the components being referred to by reference numbers which are illustrated in the drawings. In this third embodiment, the inclination of the adjustable swash plate 27 is controlled in the reverse direction to that of the swash plate 17, and the coefficient ($k^1$) is adopted when a rotor 16 is used as an input rotor, and the coefficient (k) is adopted when a rotor 10 is used as an input rotor.

Figure 18:
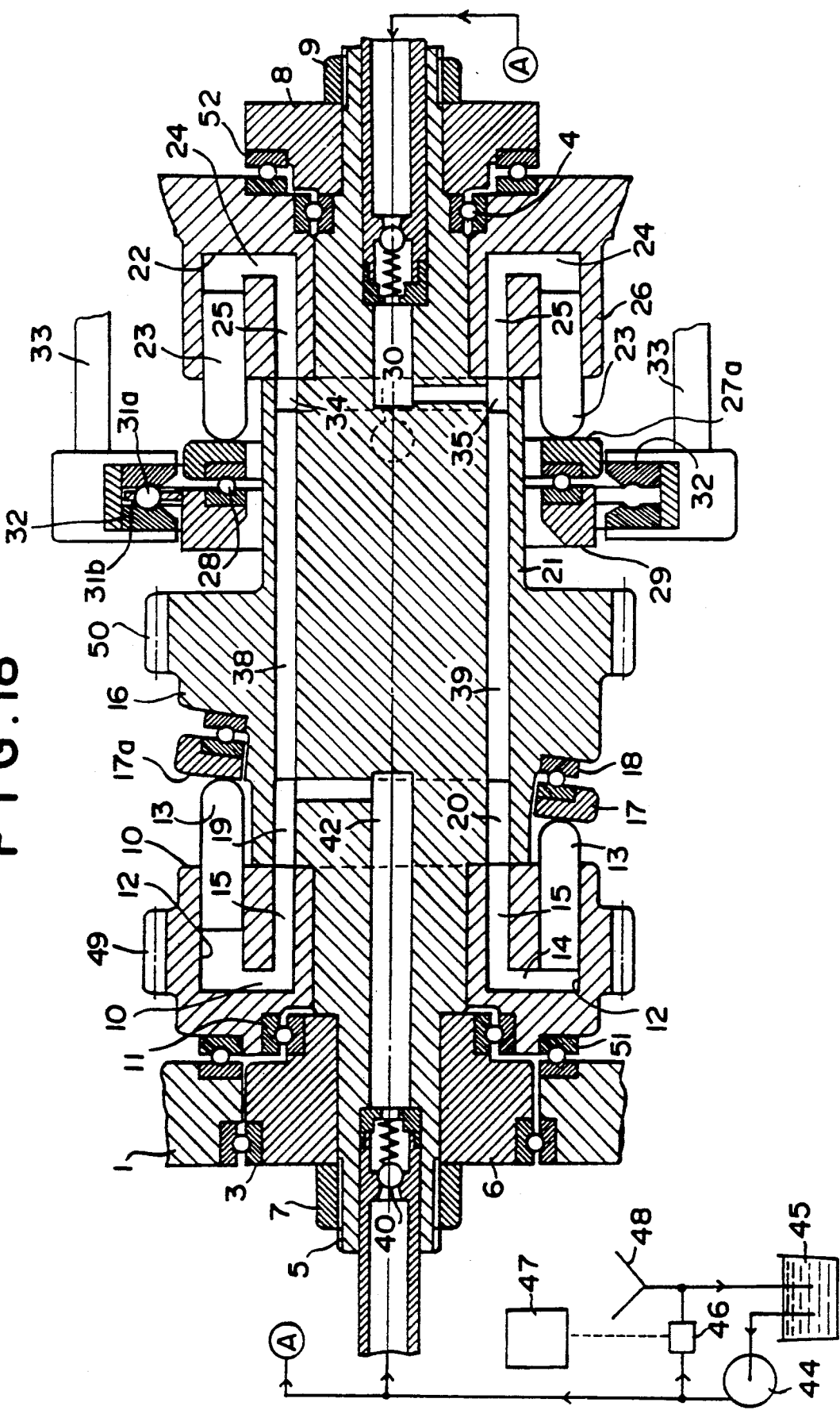
FIG. 18 is a vertical cross section of a modification of said torque transmission device of said third embodiment.

A modification of the third embodiment is illustrated in FIG. 18 wherein the left-half portion of the drawing is identical to that of FIG. 10, namely, the modification is accomplished with the power transmission area in the second embodiment being assembled at the control area in the third embodiment. Accordingly, the construction and function of the torque transmission device in this embodiment should be understood without a detailed explanation.

Figure 19:
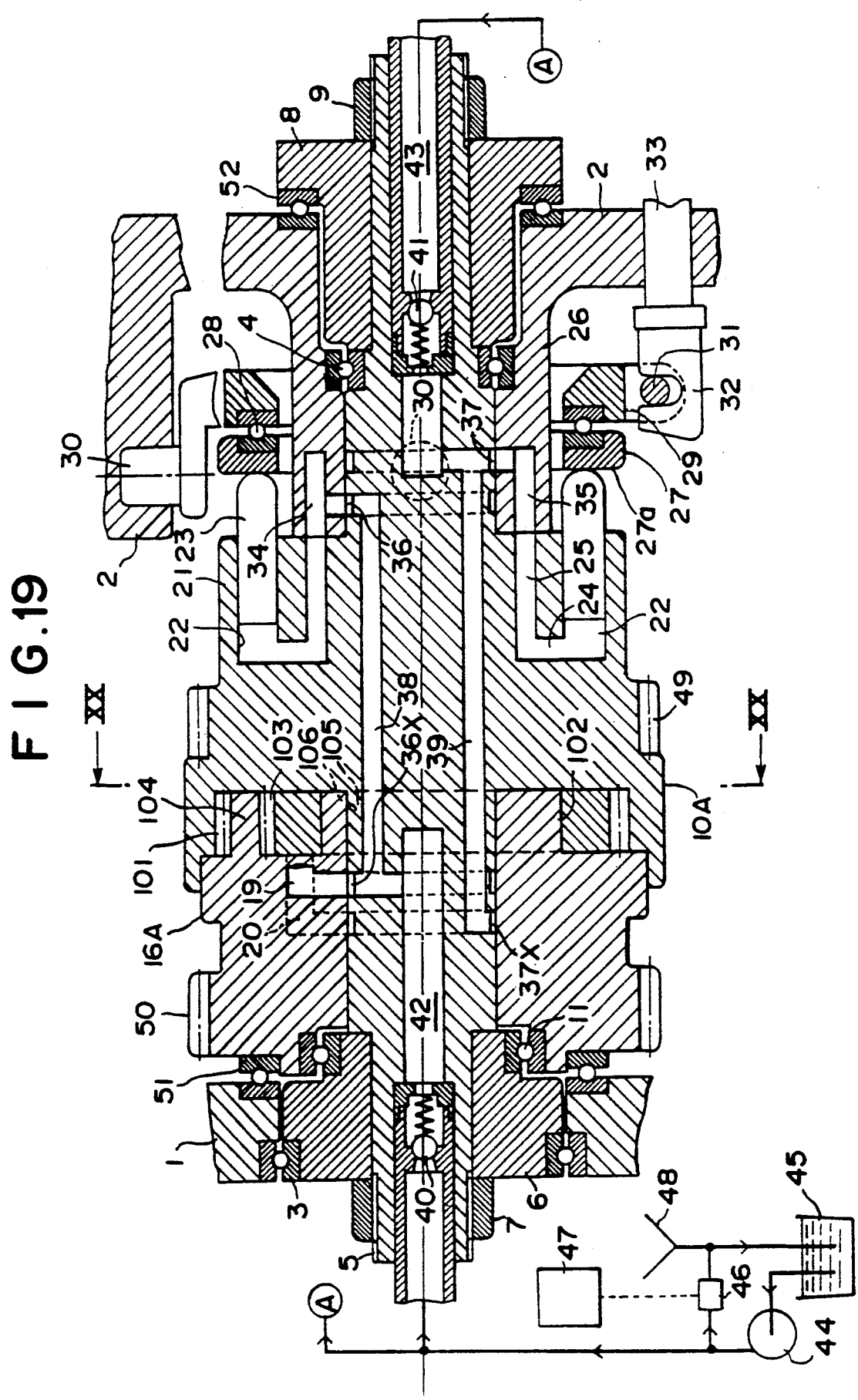
FIG. 19 is a vertical cross section of a fourth embodiment of this invention.
Figure 20:
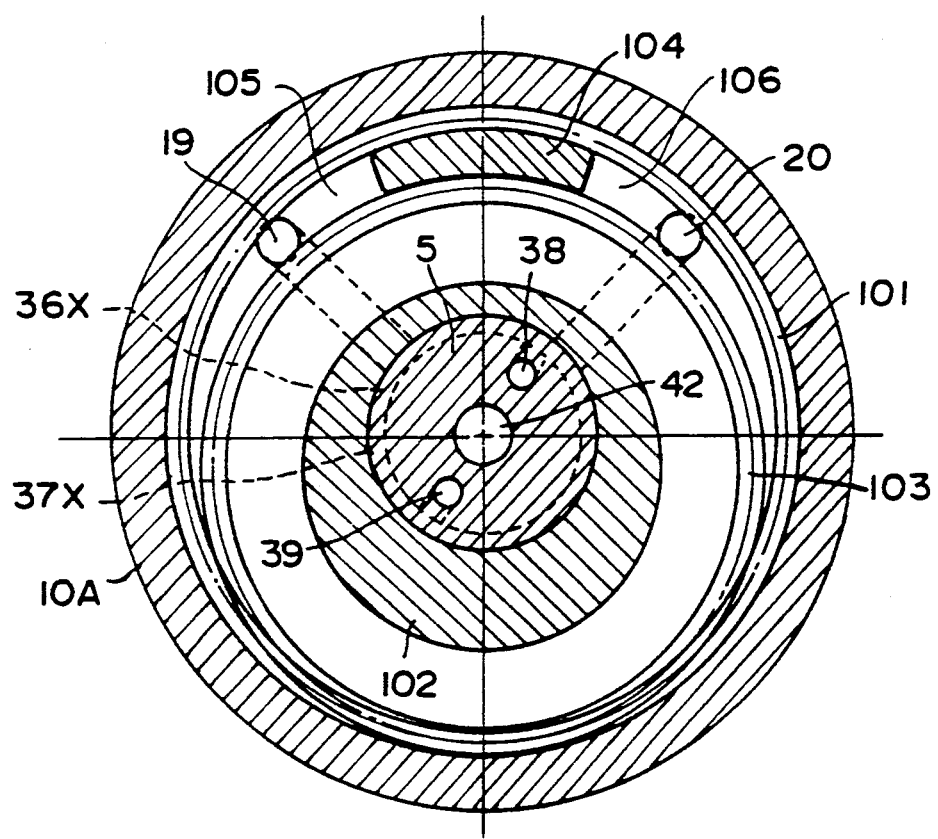
FIG. 20 is a cross section which is indicated by a line XX—XX on FIG. 19.

The fourth embodiment of this invention illustrated in FIGS. 19 and 20 includes an input rotor 10A having an internal gear 101 as a pump-driving means, and an output rotor 16A having pump-driven means. The pump-driven means comprises a rotor body 102, a planetary gear 103 rotatably supported on the rotor body 102 in a manner to be eccentrically disposed relative to the axis of the rotor body 102. The rotor body includes inlet and outlet ports 19 and 20 at both sides of the planetary gear 103, and a partition 104 separating two chambers 105 and 106 communicated with the inlet and outlet ports 19 and 20 by a space surrounded by the internal gear 101. The internal and planet gears 101 and 103 are mutually intermeshed so as to cause fluid in the chambers to be pumped when the input and output rotors 10A and 16A are differentially rotated relative to each other. Such a pumping mechanism has been well known in the prior art, though the internal gear is not rotatable but is set in a static position in the prior art.

As illustrated in the first embodiment, a control rotor 21 is integrally formed on the input rotor 10A. A stator 26, similar to that of the first embodiment, includes an adjustable swash plate 27 with its guide surface 27a supported to a support disc 29 through a bearing 28 and outlet and inlet ports 34 and 35 communicated through passages 38 and 39 with the inlet and outlet ports 19 and 20. The control rotor 21 includes a plurality of cylindrical bores 22, a plurality of plunger members 23 and a plurality of through bores 25 through which the cylindrical bores 22 are communicated orderly with the outlet and inlet ports 34 and 35.

In order to understand with ease the power transmission of this embodiment, the following three conditions are assumed. Namely, under an extreme condition wherein the fluid to be pumped is held with no or small flowing resistance since the adjustable swash plate 27 is turned by means of pivot pins 30 to a small inclination angle, the planetary gear 103 is rotated to an eccentric axis set to the output rotor 16A which as yet is not rotated, though the rotating torque applied to the input rotor 10A is operated to the gear pump mechanism constituted by both the pump-driving and pump-driven means mentioned above.

Under another extreme condition wherein the fluid to be pumped is held with an enormous flowing resistance since the adjustable swash plate 27 is set to be at the inclination shown in FIG. 19, i.e., perpendicular to the axis or a rotary shaft 5, the planetary gear 103 is carried on a circle defined by an eccentric radius with its teeth intermeshed with those of the internal gear 101 in a no rotating condition, so as to substantially transmit the same rotation as that of the input rotor 10A to the output rotor 16A.

Under an intermediate condition in which the fluid to be pumped is held with a suitable flowing resistance caused by a controlled inclination of the adjustable swash plate 27, a differential rotation is generated between the input and output rotors 10A and 16A, wherein the internal and planetary gears 101 and 103 are mutually rotated for a pumping operation, and the planetary gear 103 is carried behind the internal gear 101 by a delayed rotation. Therefore, the torque transmission device of the fourth embodiment can be completely operated to obtain a varied speed control.

The fourth embodiment may be so modified as to exchange the functions of both rotors 10A and 16A together with the pump-driving and pump-driven means in a reverse use wherein the rotor 10A becomes an output rotor and the rotor 16A becomes an input rotor.

Figure 21:
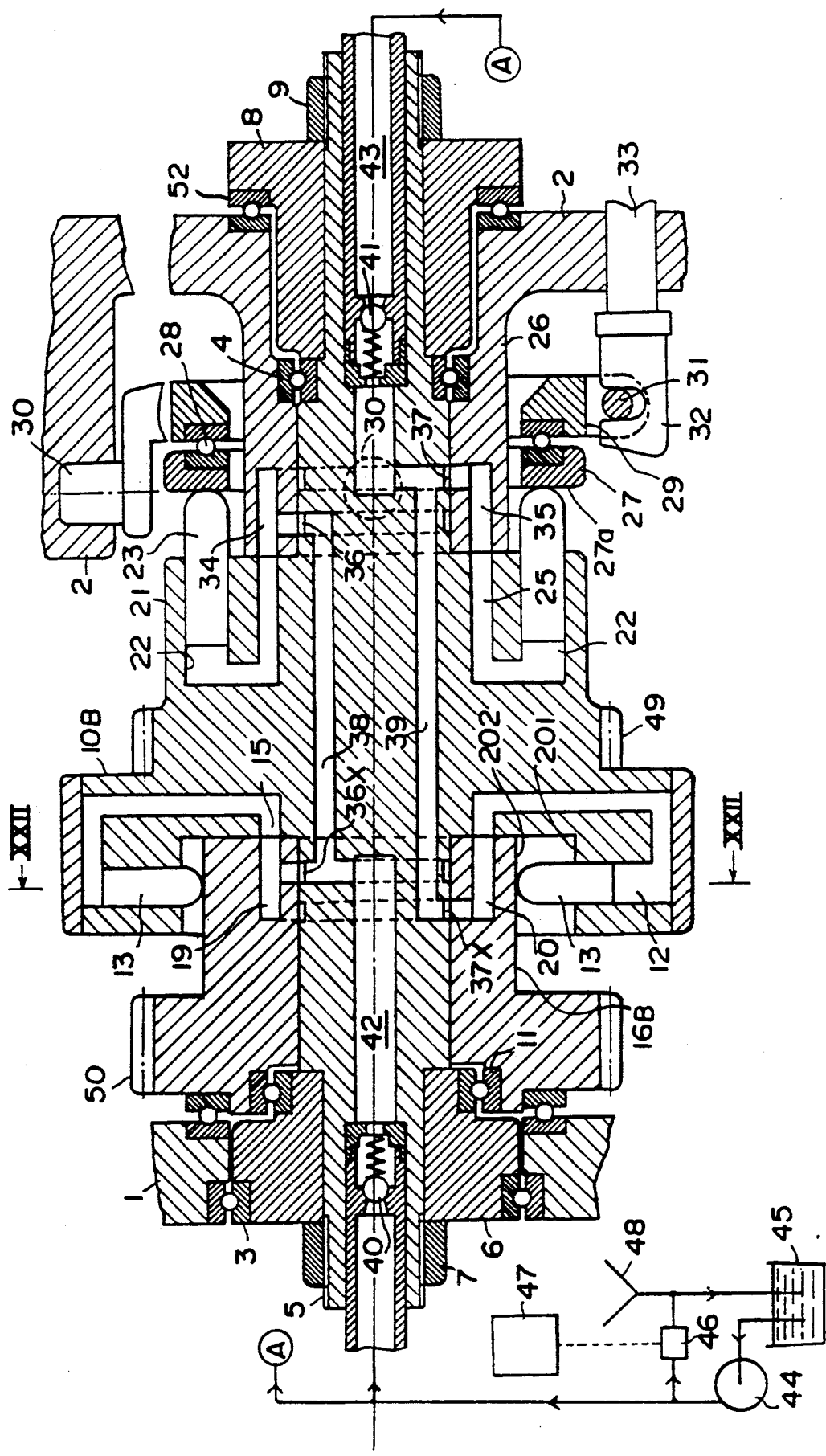
FIG. 21 is a vertical cross section of a fifth embodiment of this invention.
Figure 22:
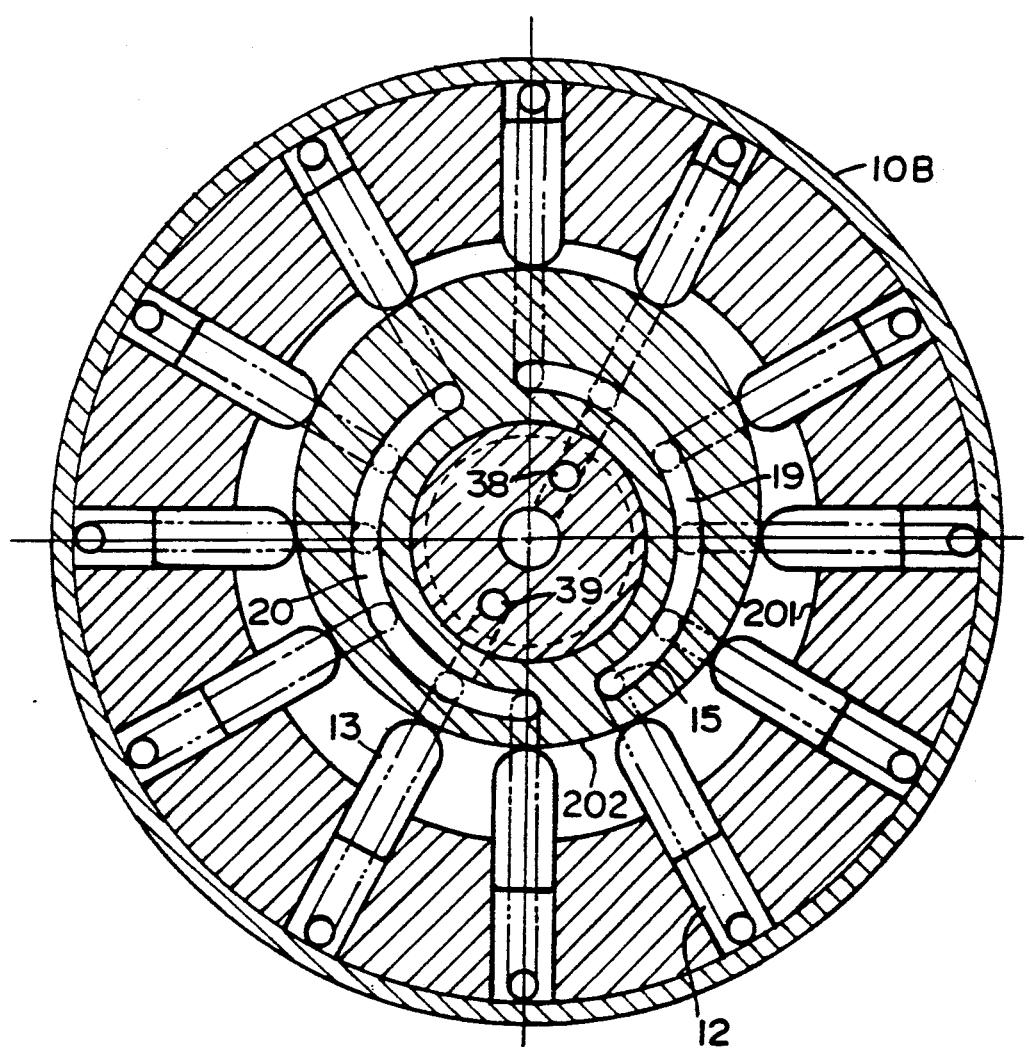
FIG. 22 is a cross section which is indicated by a line XXII—XXII on FIG. 21.

FIGS. 21 and 22 illustrate a fifth embodiment of a torque transmission device of this invention. The feature of this embodiment, as compared to the first embodiment, is to provide plunger members arranged in a radial direction and an eccentric ring member, instead of the swash plate mentioned above. Namely, in the fifth embodiment, an input rotor 10B includes pump-driving means which comprises an outer ring member 201. An output rotor 16B includes pump-driven means which comprises an inner ring member 202 disposed eccentric to the axis of the output rotor 16B in a manner to be positioned opposite to the outer ring member 201 approximately in a radial direction, and inlet and outlet ports 19 and 20 disposed at both sides of eccentricity of the inner ring member 202. The outer ring member 201 is integrally formed with the input rotor 10B and has a plurality of cylindrical bores 12 equally spaced on a prescribed pitch circle co-axial to that of the corresponding rotor 10B and extending in a radial direction respectively, a plurality of plunger members 13 slidably inserted into the cylindrical bores 12 respectively in a manner to be slidably guided by the eccentric ring member 202, and a plurality of through bores 15 for communicating the cylindrical bores orderly with the inlet and outlet ports opposite to the through bores 15 when the input and output rotors 10B and 16B are differentially rotated with respect to each other.

The many components in the control area of the fifth embodiment such as a control rotor 21, a stator 26, flow-control means with a swash plate 27, secondary outlet and inlet ports 34 and 35, flow-return means including cylindrical bores 22, plunger members 23 and through bores 25, and the other components are substantially the same as those described in the first embodiment. Accordingly, an explanation of the control area and portions relative thereto is eliminated in this description.

Similarly, the function of the device in the fifth embodiment will be fully understood from the illustration of FIGS. 21 and 22 and the detailed description of the first embodiment.

The partial portions of the device in the fifth embodiment can be functionally modified as follows. Namely, in this case the rotor 10B may be used as an output rotor and the rotor 16B as an input rotor in reverse use. In accordance with the functional exchange of the rotors, the pump-driving and pump-driven means should be situated in a reverse manner.

Figure 23:
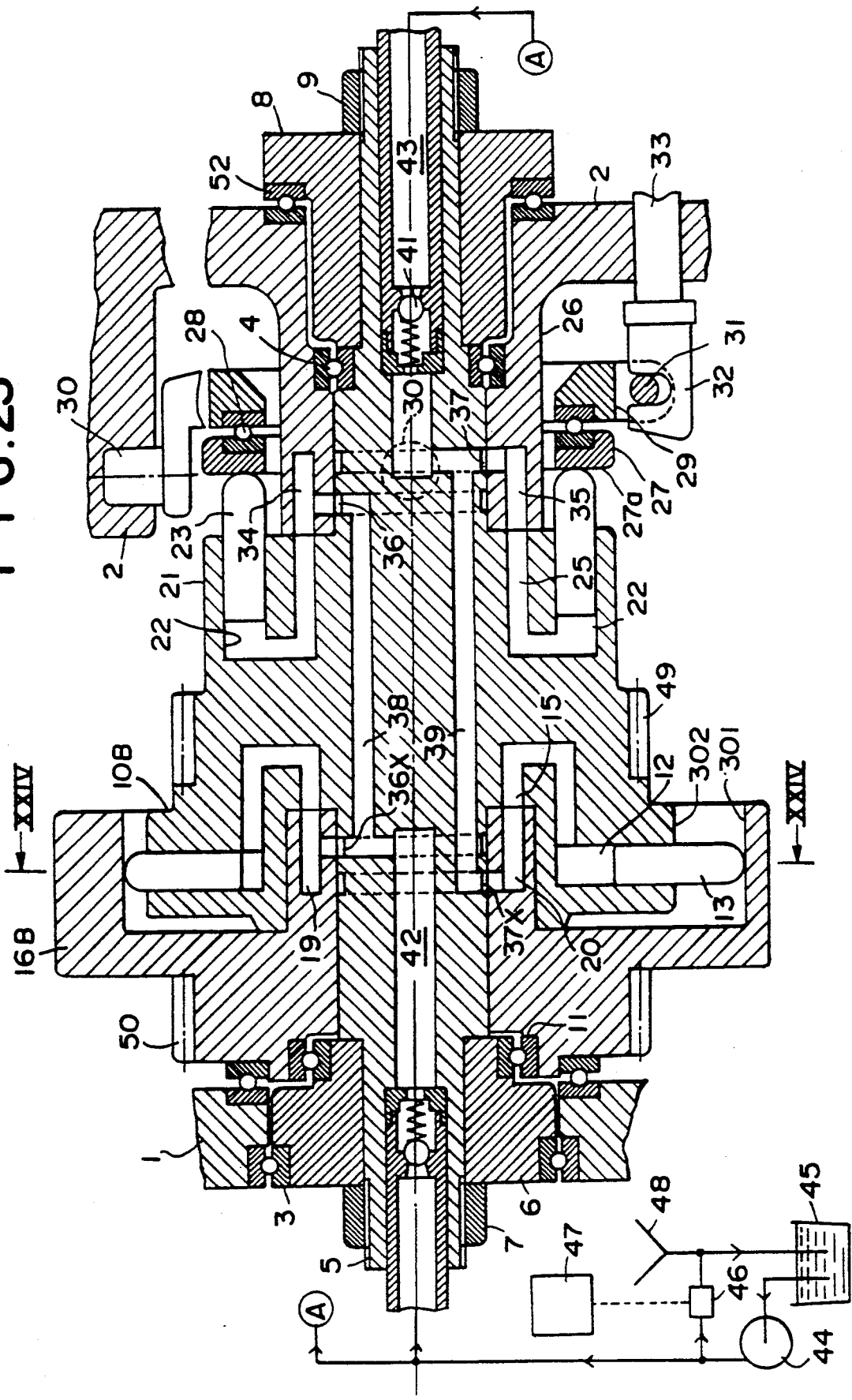
FIG. 23 is a vertical cross section of a sixth embodiment of this invention.
Figure 24:
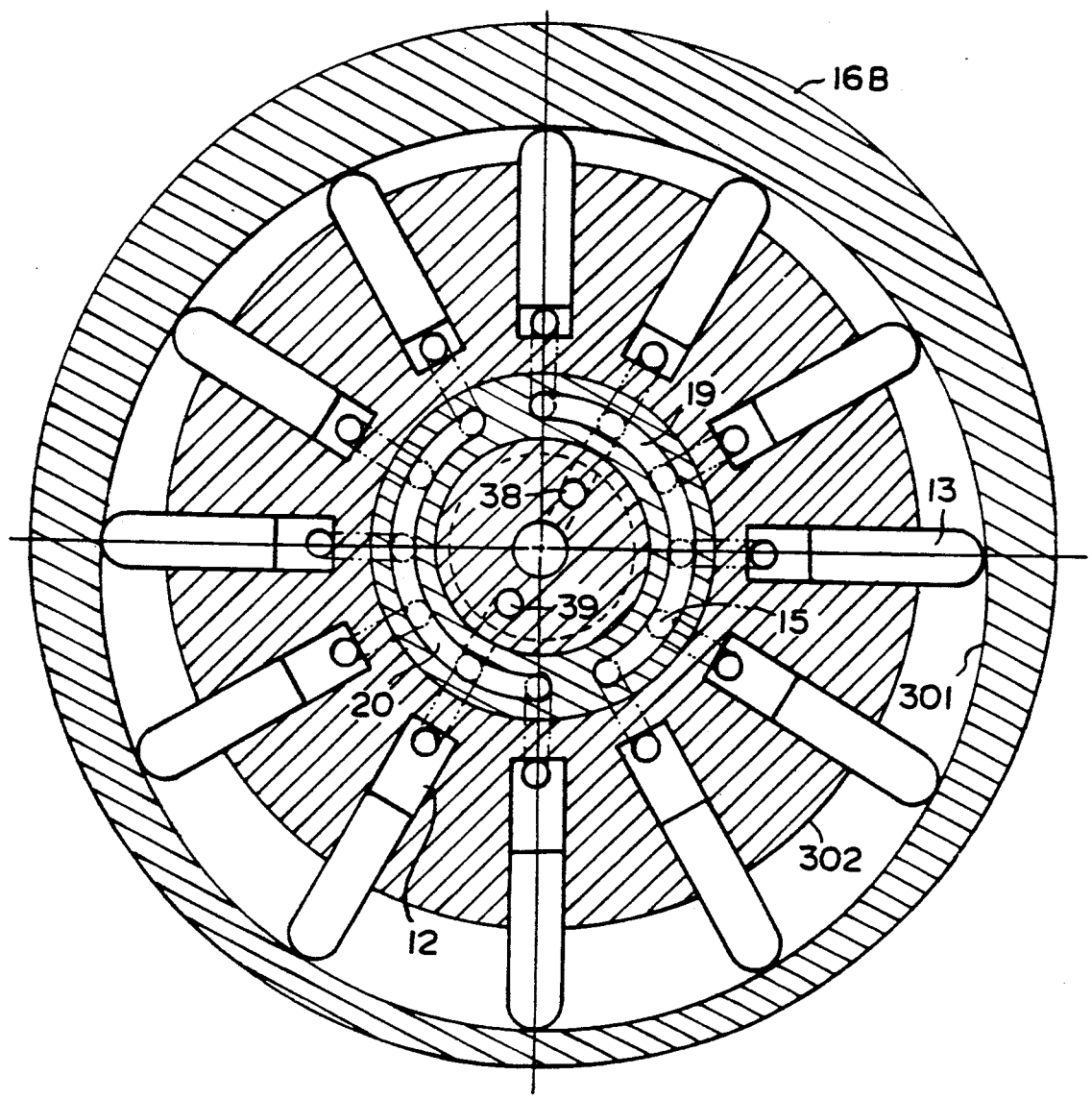
FIG. 24 is a cross section which is indicated by a line XXIV—XXIV on FIG. 23.

The sixth embodiment of this invention as illustrated in FIGS. 23 and 24 is a modification of the fifth embodiment. In this case, an eccentric ring member is an outer ring member 301 which is applied to an output rotor 16B as a pump-driving means member 302 is applied to an input rotor 10B as a pump-driven means which comprises a plurality of cylindrical bores 12 equally spaced on a prescribed pitch circle co-axial with the corresponding rotor 10B in a manner to extend in a radial direction respectively. A plurality of plunger members 14 are slidably inserted into the cylindrical bores 12, and a plurality of through bores 15 are provided for communicating the cylindrical bores 12 in turn with the inlet and outlet ports opposite to the through bores 15. The other components are the same as those of the device of the fifth embodiment as shown in the drawing.

Each of the particular portions of the assemblies in the fourth, fifth and sixth embodiments can be applied to either one of the corresponding assemblies in the first, second and third embodiments.

Figure 25:
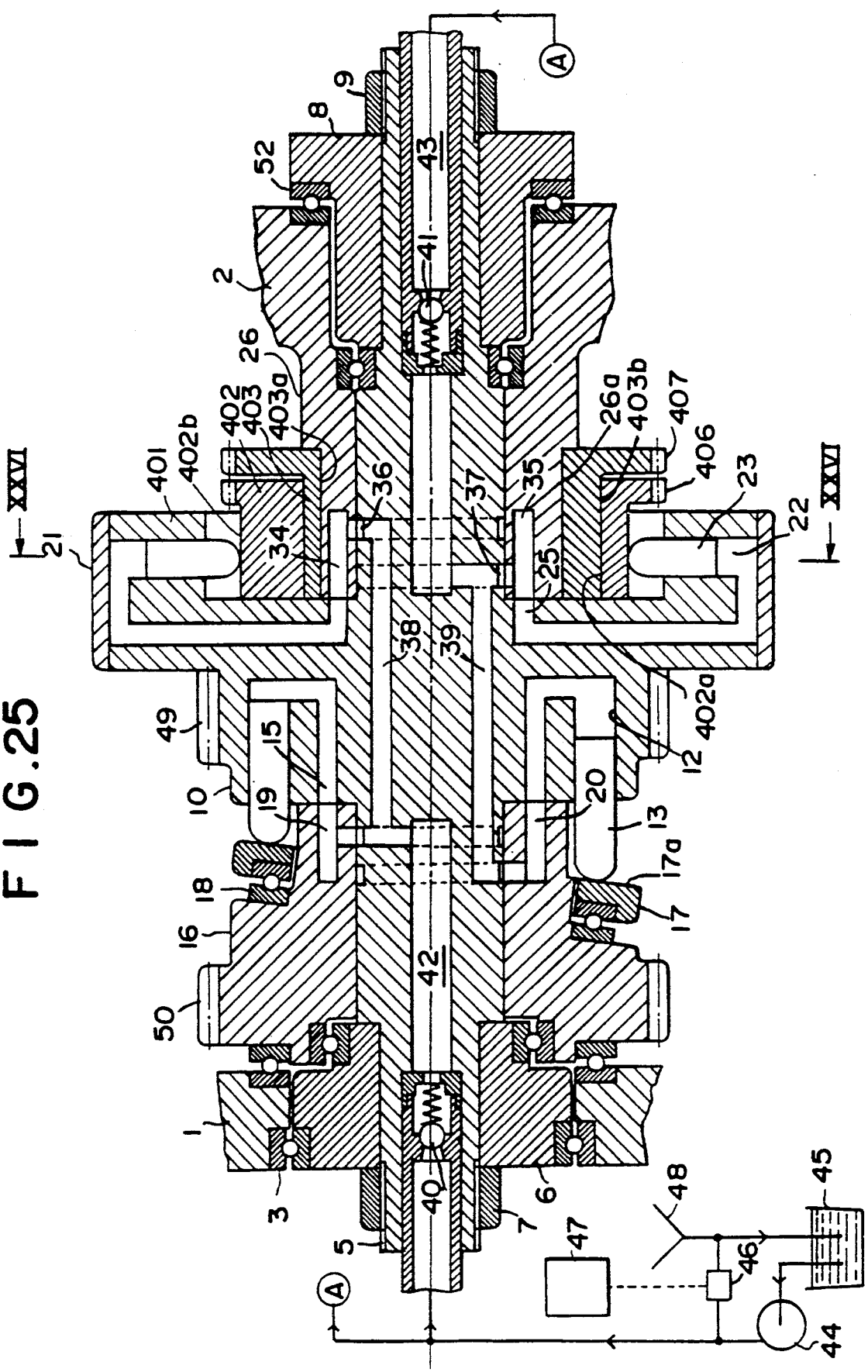
FIG. 25 is a vertical cross section of a seventh embodiment of this invention.
Figure 26:
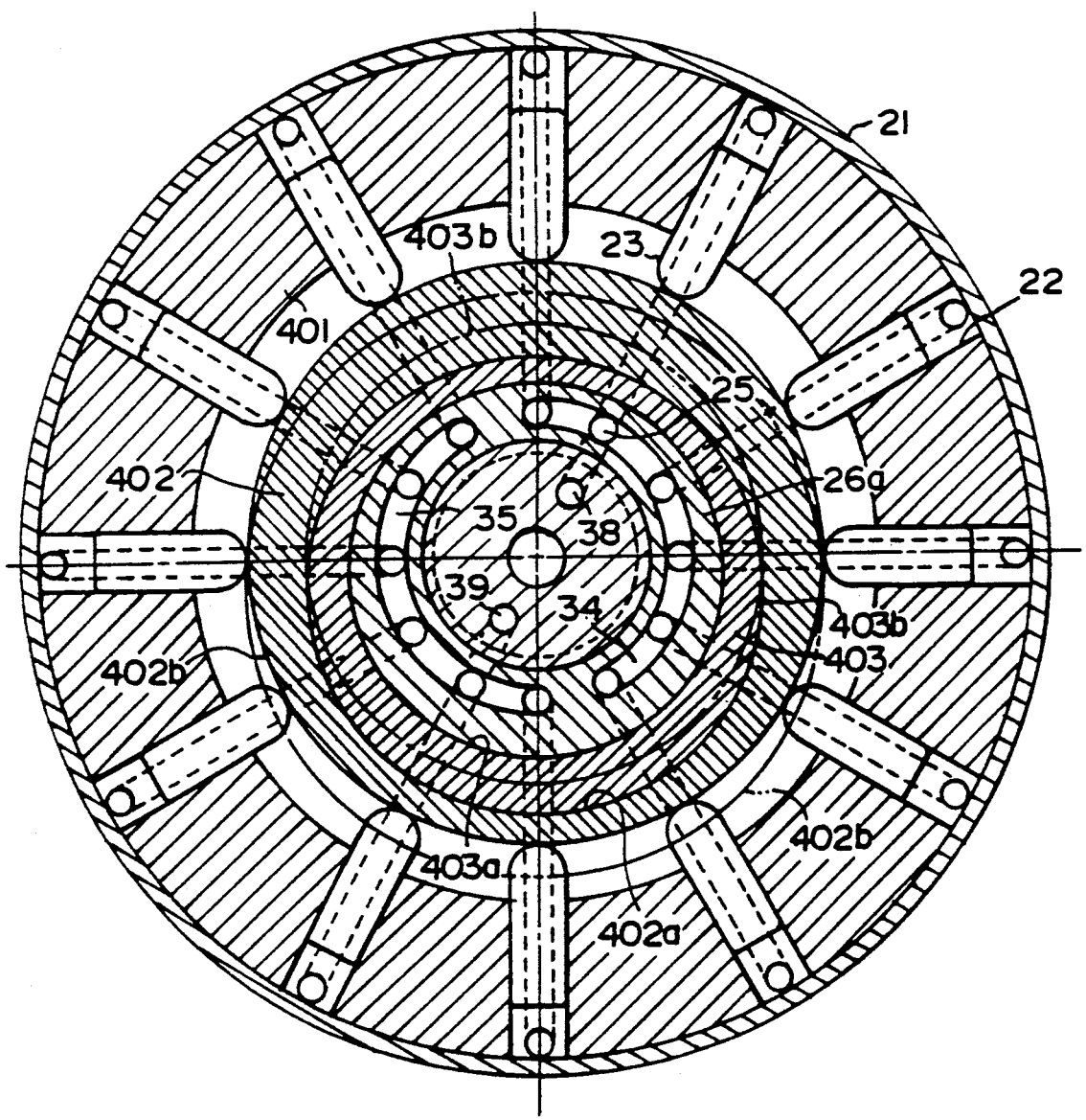
FIG. 26 is a cross section which is indicated by a line XXVI—XXVI on FIG. 26.
Figure 27:
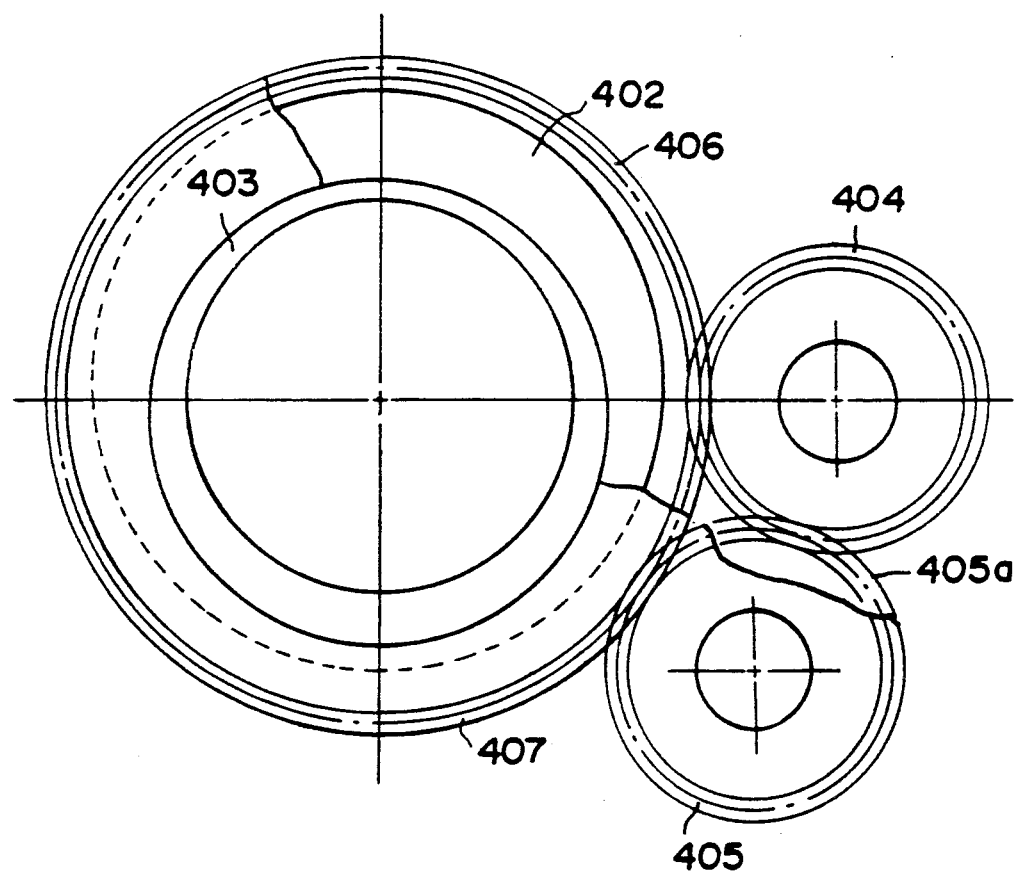
FIG. 27 is an end view of means for regulating fluid flow with gear trains adapted to said seventh embodiment.

The final embodiment of this invention illustrated in FIGS. 25 to 27 is applied to the control area of the torque transmission device. Namely, a control rotor 21 includes an outer ring member 401 as a flow-return means with its inner periphery being co-axial with the axis of the control rotor, and has a plurality of cylindrical bores 22 equally spaced on a prescribed pitch circle co-axial with the rotor axis to extend in a radial direction respectively, a plurality of plunger members 23 slidably inserted into the cylindrical bores 22 respectively, and a plurality of through bores 25. A stator 26 includes an inner ring member 402 by means of which the plunger members 23 are guided in a radial direction and having an inner periphery 402a formed on a circle described at a center eccentric to the inner ring member 402. A control ring member 403 is provided to regulate an eccentric distance to which the outer periphery 402b of the inner ring member is settled.

The control ring member 403 has an inner periphery 403a rotatably slidable relative to a journal portion 26a formed on the stator 26 and eccentric to the rotor axis, and an outer periphery 403b formed on a circle described at a center eccentric to the axis of its inner periphery 403a. The control ring member 403 is rotatably inserted into a hollow portion surrounded by the inner periphery 402a. The eccentric centers of both ring members 402 and 403 are set at positions opposite to the center of the stator journal portion.

The rotating motions of the inner ring member 402 and control ring member 403 on the journal portion 26a are mutually restricted by means of gear trains. The gear trains include a control gear 404 to be manually or mechanically turned, counter gears 405 and 405a, the latter being intermeshed with the control gear 404, and two driven gears 406 and 407, one of which is integrally formed or mounted on the end portion of the inner ring member 402 and intermeshed with the control gear 404, and the other of which is integrally formed to or mounted on the end portion of the control ring member 402 and intermeshed with the counter gear 405. By such gear trains, the inner ring member 402 and control ring member 403 are rotated at the same rate but in reverse directions, whereby the center of the output periphery 402b of the inner ring member 402 can be shifted so as to trace along a straight line across the center of the journal axis. Accordingly, as the inner ring member 402 is regulated, the reciprocating stroke of each of the plunger members 23 is determined on one side.

The stator 26 further includes outlet and inlet ports 34 and 35 disposed at both sides of a direction to which the inner ring member 402 is eccentrically moved, the outlet and inlet ports 34 and 35 facing the through bores 25 and individually communicating with passages 38 and 39 which are adapted to pass fluid to the torque transmission area.

The other components illustrated in FIGS. 25 to 27 are substantially the same as in the first embodiment, and are given the same reference numbers. The essential functions of the device of the final embodiment are substantially the same as in the first embodiment. Accordingly a further explanation of the final embodiment is unnecessary in view of the similar description of the other embodiments.

Finally, the particular assembly of the device of the final embodiment can be applied to any of the corresponding assemblies of the other embodiments described above.

I claim:

1. A torque transmission apparatus having a hydraulic assembly with a variable speed control, comprising:
    first and second rotors (16, 10) at a power side of the transmission apparatus, and which are co-axially rotatable with each other, said first rotor (16) having a swash plate (17) facing said second rotor (10) and two substantially half-circular shaped ports (19, 20) positioned on both sides of inclination of said swash plate (17);
    said second rotor (10) having a plurality of cylindrical bores (12) formed on one end thereof, said cylindrical bores (12) having open ends facing said swash plate (17) and the other ends of said cylindrical bores (12) being respectively communicated with corresponding through bores (15) arranged on the same circle as that of said ports (19, 20) and orderly communicated with said ports;
    a plurality of plunger members (13) slidably inserted into said cylindrical bores (12) respectively, said plunger members (13) having outer ends guided by said swash plate (17);
    a control rotor (21) and stator (2) at a control side of the transmission apparatus;
    said stator (2) having a variable swash plate (27) facing said control rotor (21) and adjustable in inclination, and two substantially half circular shaped ports (34, 35) positioned to both sides of its inclination;
    said control rotor (21) being integrally formed with said second rotor (10) and having plurality of cylindrical bores (22) formed at one end thereof, said cylindrical bores (22) of said control rotor (21) having open ends facing said variable swash plate (27) and having corresponding through bores (25) arranged on the same circle as that of said parts (34, 35) of said stator (2) and orderly communicated with said ports (34, 35) of said stator (2);
    a plurality of plunger members (23) slidably inserted into said cylindrical bores (22) of said control rotor (21) respectively, with their outer ends being guided by said variable swash plate (27) of said stator (2);
    means for controlling the inclination of said variable swash plate (27) of said stator (2);
    two passages (38, 39) adapted to communicate said ports (19, 20) of said first rotor with said ports (34, 35) of said stator; and
    supply means for supplying liquid at a prescribed back-up pressure to said ports (19, 20) of said first rotor and to said ports (34, 35) of said stator through said passages (38, 39);
    said supply means including one-way valves (40, 41) coupled to said passages (38, 39) respectively.

2. The torque transmission device of claim 1, wherein:
    said first rotor (16) is coupled to a rotor at a power output side;
    said second rotor (10) is coupled to a rotor at the power input side;
    said swash plates (17, 27) are coupled to a pump-driving means; and
    said plunger members (13, 23) together with said cylindrical bores (12, 22) and through bores (15, 25) and said ports (19, 20; 34, 35) are coupled to a pump-driven means.

3. The torque transmission of claim 1, wherein:
    said first rotor (16) is coupled to a rotor at the power input side;
    said second rotor (10) is coupled to a rotor at the power output side;
    said swash plate (17, 27) is coupled to a pump-driving means; and
    said plunger members (13, 23) together with said cylindrical bores (12, 22) and through bores (15, 25) and said ports (19, 20; 34, 35) are coupled to a pump-driven means.

4. The torque transmission device of claim 1, wherein said cylindrical bores (12, 22) are separated into two groups, the respective bores of which are alternately arranged on a common pitch circle so as to be formed directed to the interior of a compact rotor body including said rotors (10, 21), and open ends of said cylindrical bores (12, 22) are opposite to the ends of said compact rotor body.

5. The torque transmission device of claim 1, wherein said supply means includes a pump (44) and a pressure control valve (46).

* * * * *